US005764945A

United States Patent [19]
Ballard

[11] Patent Number: 5,764,945
[45] Date of Patent: Jun. 9, 1998

[54] CD-ROM AVERAGE ACCESS TIME IMPROVEMENT

[76] Inventor: Clinton L. Ballard, 4721 NW. Blackhawk Ct., Bremerton, Wash. 98312

[21] Appl. No.: 664,454

[22] Filed: Jun. 17, 1996

Related U.S. Application Data

[63] Continuation of Ser. No. 194,104, Feb. 9, 1994, and Ser. No. 585,808, Jan. 26, 1996.

[51] Int. Cl.$^6$ .................................................. G06F 12/08
[52] U.S. Cl. ........................ 395/440; 395/445; 395/465
[58] Field of Search ................................. 395/440, 445, 395/442, 441, 494, 404, 403, 428, 439, 444, 465; 369/13, 18

[56] References Cited

U.S. PATENT DOCUMENTS

| | | |
|---|---|---|
| 4,503,501 | 3/1985 | Coulson et al. . |
| 4,506,323 | 3/1985 | Pusic et al. . |
| 4,571,674 | 2/1986 | Hartung . |
| 4,598,357 | 7/1986 | Swenson et al. . |
| 4,719,568 | 1/1988 | Carrubba et al. . |
| 4,947,319 | 8/1990 | Bozman . |
| 4,987,533 | 1/1991 | Clark et al. . |
| 5,001,688 | 3/1991 | Louvenberg et al. . |
| 5,021,946 | 6/1991 | Korty . |
| 5,034,914 | 7/1991 | Osterlund . |
| 5,134,563 | 7/1992 | Tayler et al. . |
| 5,146,576 | 9/1992 | Beardsley et al. . |
| 5,195,100 | 3/1993 | Katz et al. . |
| 5,224,217 | 6/1993 | Zangenehpour . |
| 5,257,370 | 10/1993 | Letwin . |
| 5,261,072 | 11/1993 | Siegel . |
| 5,269,019 | 12/1993 | Peterson et al. . |
| 5,283,875 | 2/1994 | Gibson et al. . |
| 5,293,608 | 3/1994 | Johnson et al. . |
| 5,313,612 | 5/1994 | Satoh et al. . |
| 5,341,493 | 8/1994 | Yanai et al. . |
| 5,347,642 | 9/1994 | Barratt . |

(List continued on next page.)

FOREIGN PATENT DOCUMENTS

| | | |
|---|---|---|
| 0273665 | 7/1988 | European Pat. Off. . |
| 0389151 | 9/1990 | European Pat. Off. . |
| 0475639 | 3/1992 | European Pat. Off. . |

OTHER PUBLICATIONS

"Lightning CD Manual"; Lucid Corporation 1993.
"CD Speedway User's Manual"; Paranode, Inc. 1992.
"Norton Speedrive Users Manual"; Symantec Corporation 1993.
CacheAll User's Manual, C&D Programming Corp. (1992, 1993).

*Primary Examiner*—Eddie P. Chan
*Assistant Examiner*—Hiep T. Nguyen
*Attorney, Agent, or Firm*—Steven P. Koda

[57] ABSTRACT

A cache for improving access to optical media includes a primary cache comprising RAM and a secondary cache comprising a portion of hard disk memory. Multiple aspects of the invention are defined: (1) Cache data discrimination: Discrimination methodology is implemented for determining when data should not be cached. Under certain conditions, caching of data is less likely to improve access time. (e.g., when the transfer rate is already exceeding a critical sustained throughput rate; when an estimated time to complete a CD-ROM data request is within a specific percentage of the estimated time to complete a hard drive disk request). (2) Secondary cache fragmentation avoidance: To keep the access time to secondary cache faster than the access time to the optical media, fragmentation of the secondary cache (i.e., hard disk) is minimized. To do so, constraints are imposed: (i) an entire CD-ROM request is stored in contiguous sectors on the hard drive; (ii) sequential CD-ROM requests to adjacent sectors of CD-ROM are concatenated on the hard drive; (iii) data redundancy is permitted). (3) Alternative update methodologies: Cache updates are performed in sequence or in parallel to primary and secondary cache depending upon the embodiment. (4) Data integrity: Integrity of data stored in non-volatile secondary cache is maintained for a substantial portion of secondary cache through power failures, shutdowns and media swaps.

4 Claims, 9 Drawing Sheets

U.S. PATENT DOCUMENTS

| | | |
|---|---|---|
| 5,353,430 | 10/1994 | Lautzenheiser . |
| 5,361,340 | 11/1994 | Kelly et al. . |
| 5,371,855 | 12/1994 | Idleman et al. . |
| 5,381,539 | 1/1995 | Yanai et al. . |
| 5,388,260 | 2/1995 | Monahan et al. . |
| 5,392,445 | 2/1995 | Takamoto et al. . |
| 5,404,487 | 4/1995 | Murata et al. . |
| 5,418,921 | 5/1995 | Cortney et al. . |
| 5,446,714 | 8/1995 | Yoshio et al. . |
| 5,448,719 | 9/1995 | Schltz et al. . |
| 5,459,856 | 10/1995 | Inoue . |
| 5,475,697 | 12/1995 | Katz et al. . |

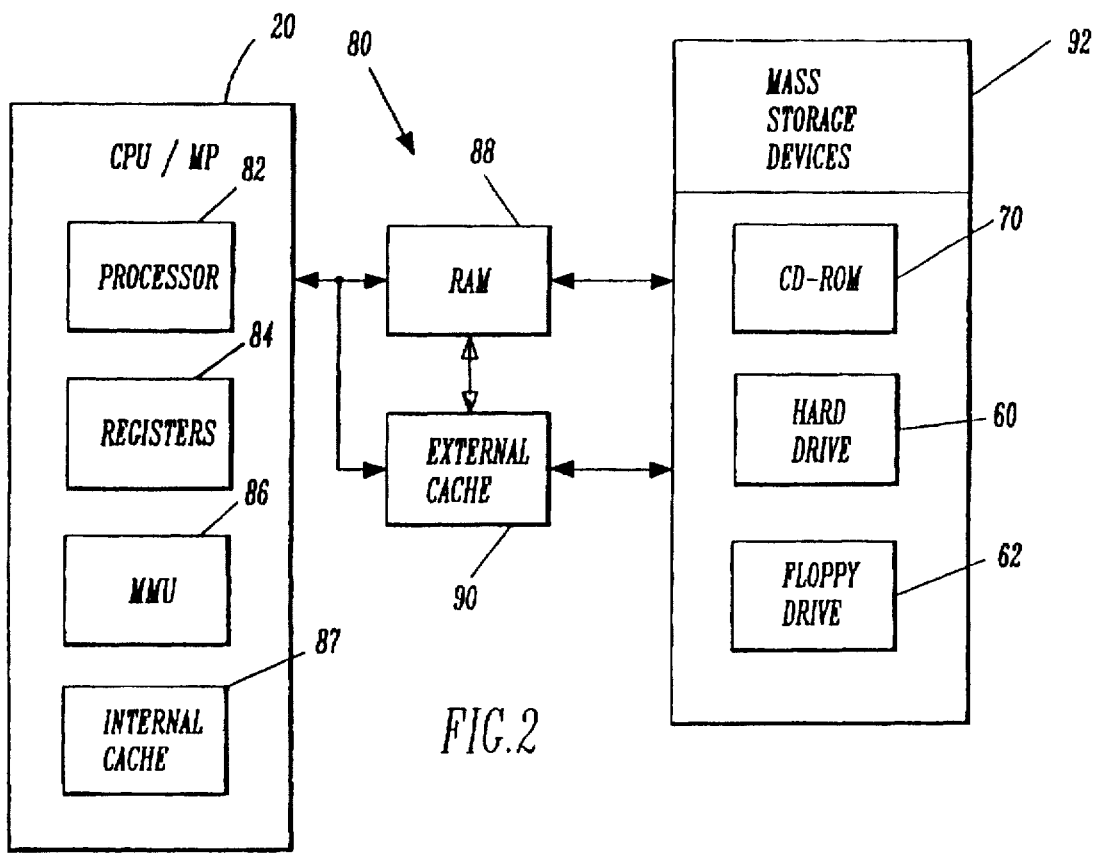
FIG.2
FIG.3
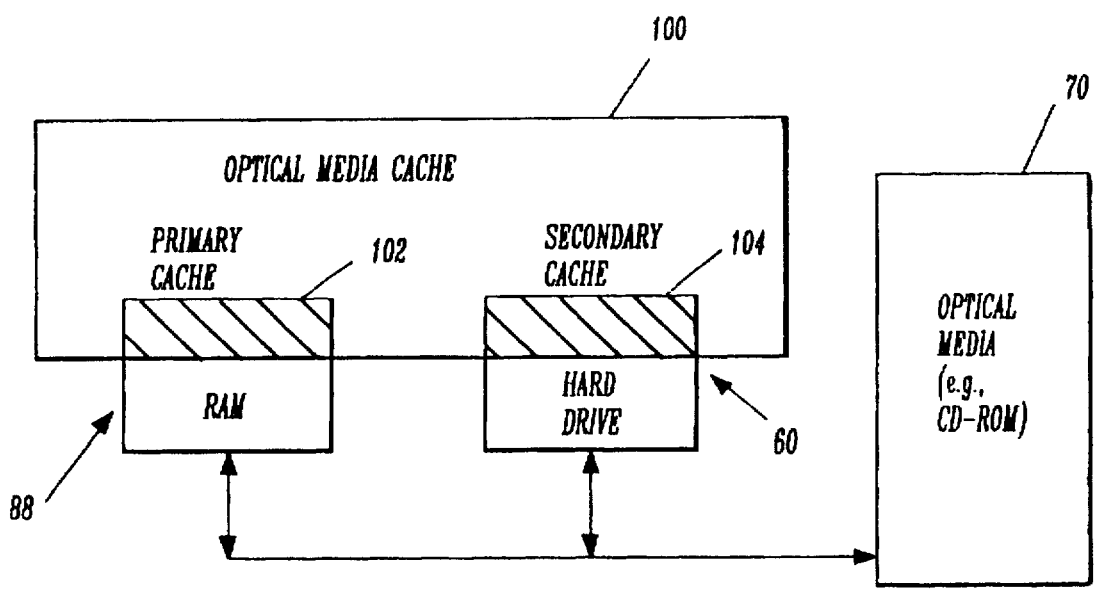

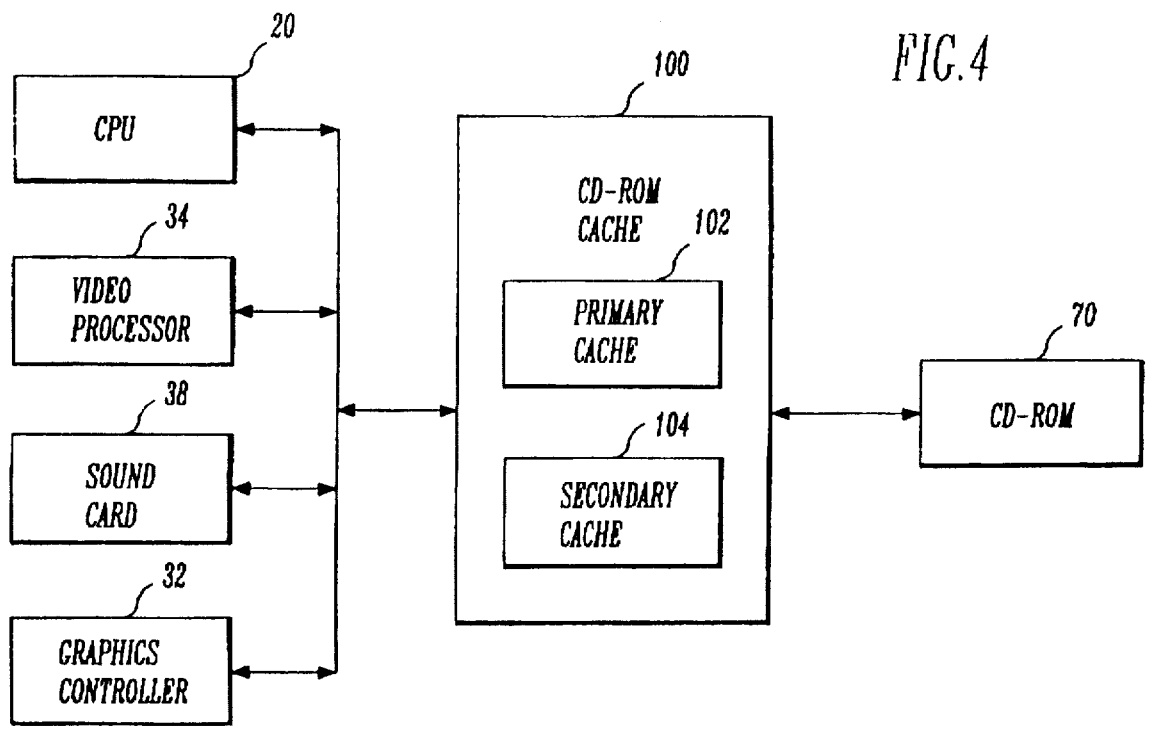
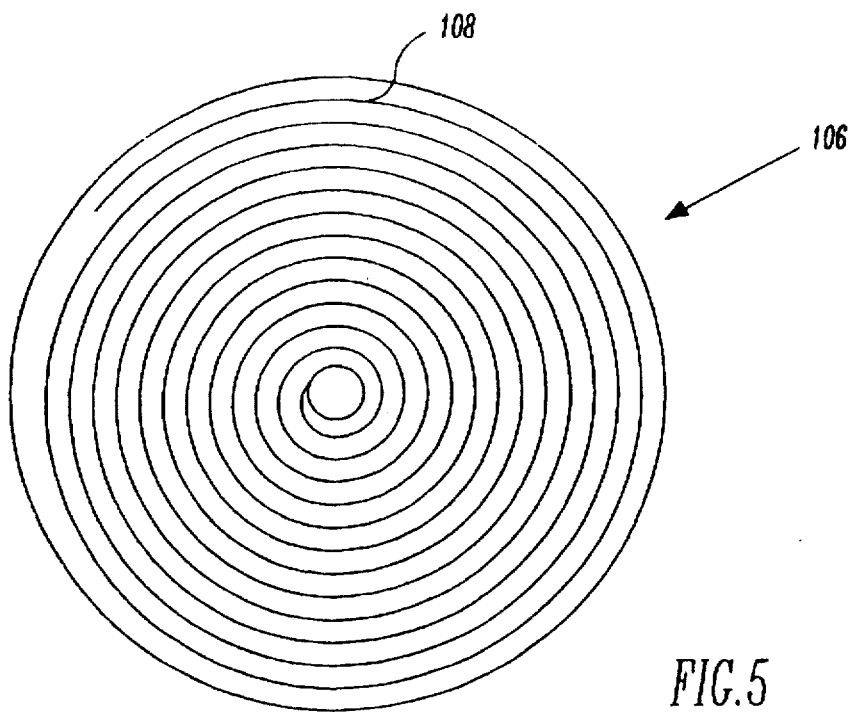

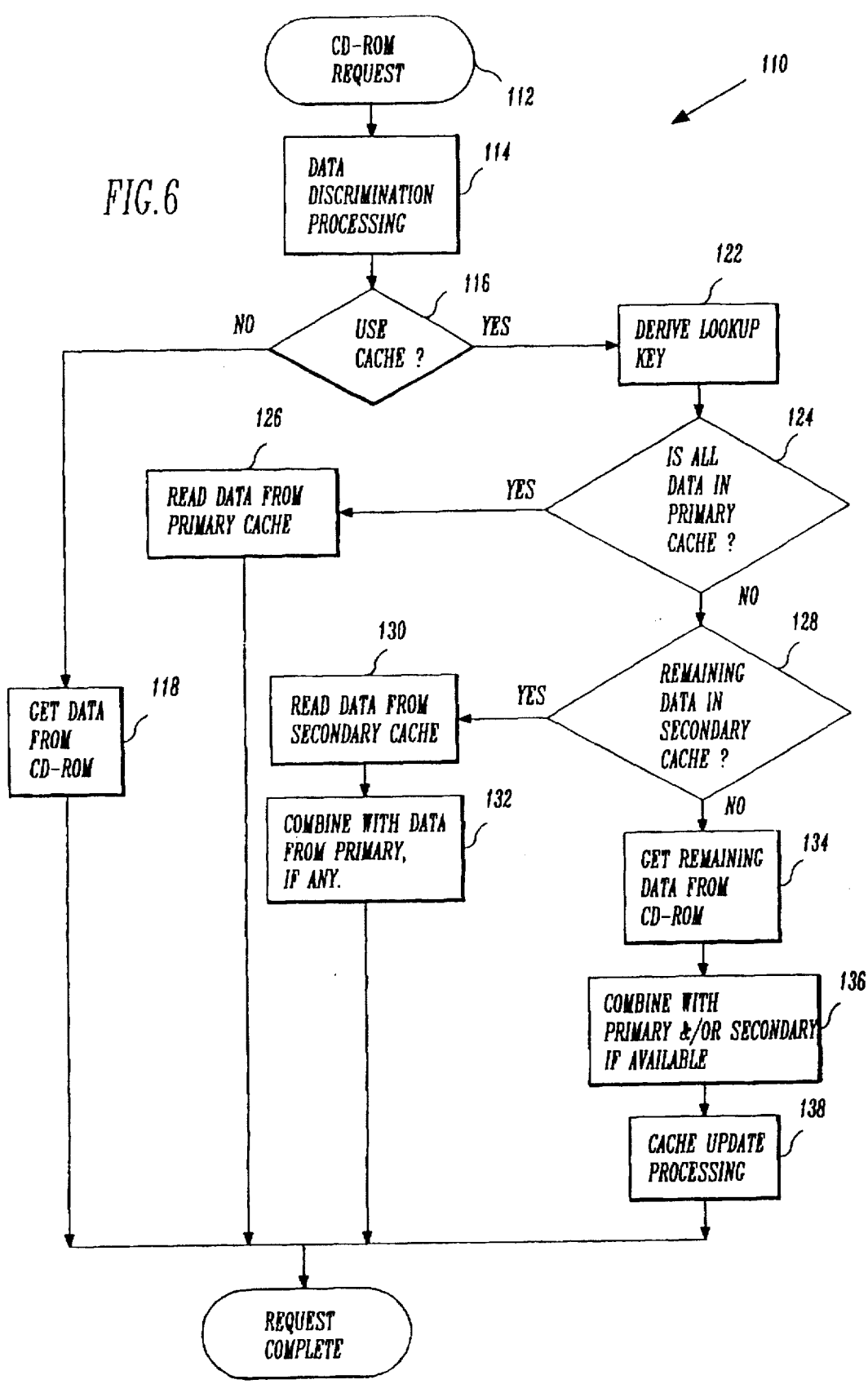

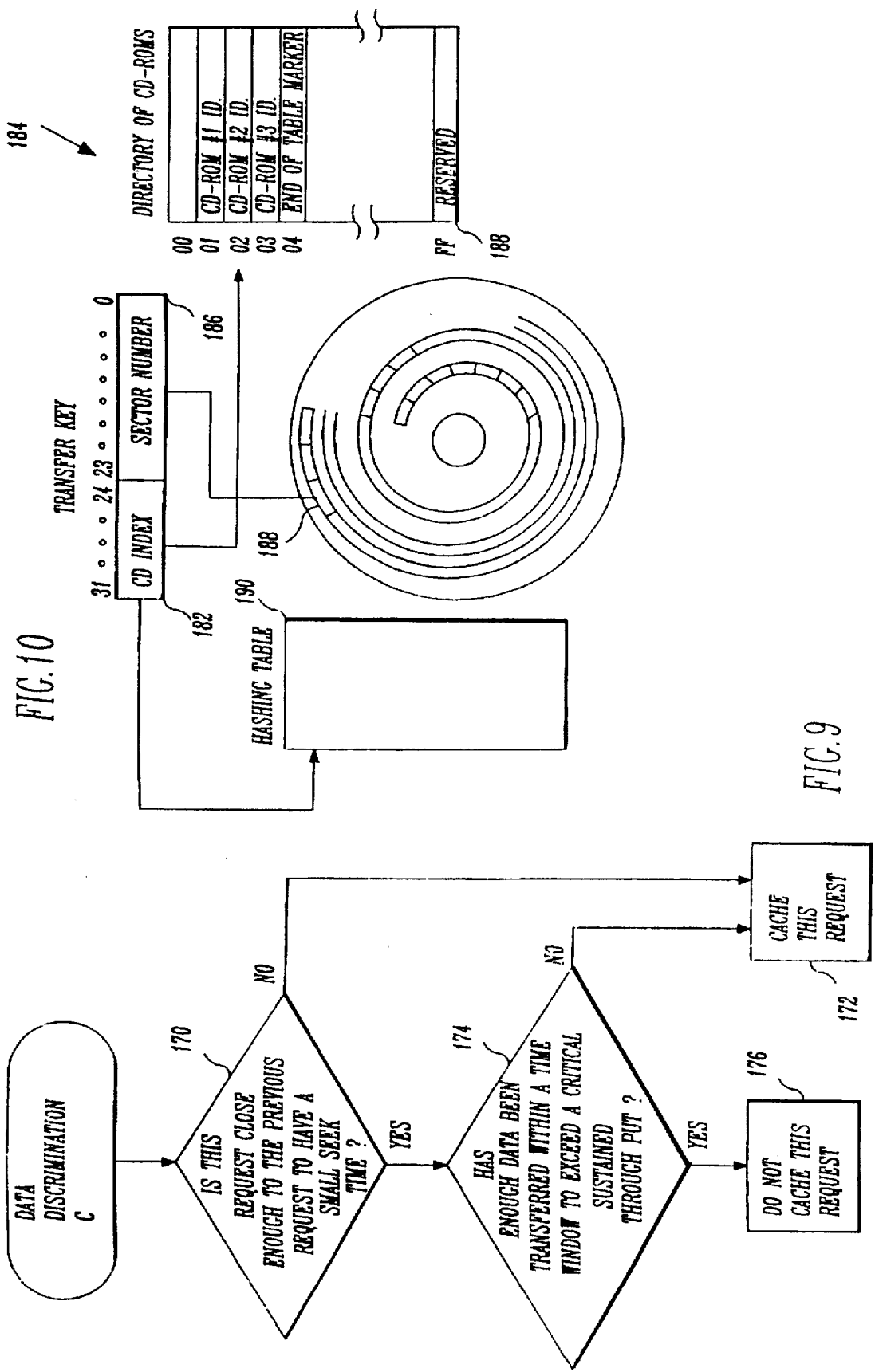

CD-ROM AVERAGE ACCESS TIME IMPROVEMENT

This is a Continuation of application Ser. No. 08/194,104 filed Feb. 9, 1994; and Ser. No. 08/585,808, filed Jan. 16, 1996.

NOTICE REGARDING COPYRIGHTED MATERIAL

A portion of the disclosure of this patent document contains material which is subject to copyright protection. The copyright owner has no objection to the facsimile reproduction by anyone of the patent document or the patent disclosure as it appears in the public Patent and Trademark Office file or records, but otherwise reserves all copyright rights whatsoever.

CROSS REFERENCE TO RELATED APPLICATION

This invention is related to U.S. patent application Ser. No. 08/194,104 filed *(same day as this)* for CACHE FOR OPTICAL STORAGE DEVICE AND METHOD FOR IMPLEMENTING SAME. The content of that application is incorporated herein by reference and made a part hereof.

BACKGROUND OF THE INVENTION

This invention relates to cache subsystems for improving access to data stored on a mass storage device. More particularly this invention relates to a cache subsystem, including a hard disk drive, for improving "access time" for information stored on an optical storage device.

Access time, in the context of microcomputer memory handling, is the time it takes a memory system to present information to a microprocessor after an address has been selected. Cache is a memory subsystem for improving access time to data stored in main or "mass" memory. The cache subsystem characteristically comprises memory having a faster access time than main memory. It is by duplicating frequently-accessed main-memory data values in cache memory that access times for such data is improved.

There are several types of main memory sources in conventional microcomputers. Sources include floppy disks, hard disks and optical storage media. Caches comprising random access memory (RAM) are common for improving access time to data stored on such disks or media. RAM has an access time of approximately 150 nano-seconds (ns). This is several orders of magnitude faster than access times for mass storage devices. For example, access time for a conventional PC floppy disk drive is on the order of seconds. Access time for a conventional PC hard drive is approximately 12-60 milliseconds (ms). Compact disk read only memory (CD-ROM), one form of optical storage media, has a storage capacity of approximately 680 megabytes and an access time of approximately 300-1000 ms. Top of the line CD-ROM drives advertise access times down to 265 ms.

When RAM prices were speculated to significantly decrease, discussion of main memory systems comprising RAM were considered by chip manufacturers. Such price decreases have not occurred. To the contrary, the relative expense of RAM makes it a precious resource in the computer. It is currently unfeasible to dedicate tens of megabytes of RAM to serve as a high-capacity cache. According to this invention, however, it is desirable to define a high-capacity cache for improving access times for CD-ROM or other high capacity optical media.

Programmers typically optimize information layout on a CD-ROM to achieve the current CD-ROM access times. Straight sequential access of optical media as during video playback or audio playback typically can occur within desired specifications to provide a user with acceptable visual and sound quality. When random seeks, however, are interspersed with full-motion video and/or sound, performance (i.e., average access time) degrades. For typical multimedia and hypermedia applications, audio/video data is interspersed with program and/or graphics data. In a conventional CD-ROM encyclopedia application, a user may spend 90% of the time accessing program and graphics data and just 10% of the time accessing audio-video or animation data. (The CD-ROM itself may comprise 50% data and 50% video/audio due to the storage intensiveness of video/audio.) A conventional CD-ROM drive meeting multimedia specifications requires a sustained throughput rate of 150 KB/second. It is the occasions when random seeks are interspersed with the full motion video or animation that problems typically arise. Using a conventional RAM cache of approximately 256 KB, the cache will fill with audio-video data very quickly. There already is significant contention for the RAM resources by the operating system. Using all of the available cache for maintaining full motion video would be unacceptable. Accordingly, a larger high-capacity cache is needed.

As RAM costs approximately $80/MB in 1994, implementation of a high-capacity cache would run approximately $1600 for merely a 20 MB high-capacity cache. Such an implementation is unfeasible. Accordingly, there is a need for an alternative structure for implementing a CD-ROM cache. In particular, there is a need for a more cost-efficient, yet technically-effective high-capacity cache structure.

Under conventional microcomputer operating conditions, a cache improves access time some of the time. Of significance is that there are transient periods during which the cache is not improving microcomputer performance. This is because conventional cache implementation methodologies call for caching substantially all data transfers. This is inefficient. It is generally accepted that 80-90% of computing time is spent processing 10-20% of the code/data, while the other 10-20% of the time is spent processing the other 80-90% of the code/data. It is for the frequently executed 10-20% of code/data that a cache provides increased performance. Caching the remaining code/data leads to little, if any, performance increase. In a CD-ROM application, however, caching this other 90% of the code/data may consume a significant portion of cache resources. For a high-capacity cache it is too costly to allocate tens of megabytes of space to this 80-90% of code/date that is infrequently accessed. Accordingly, there is a need for a more effective cache implementation which optimizes cache usage.

As described in the summary of invention and detailed description, applicant's cache, according to several embodiments, includes a portion of hard disk memory. A hard disk drive provides access times generally 10 times faster than CD-ROM access times. However, when data files stored on a hard disk are fragmented, hard drive access performance degrades. If the degradation causes access to be no faster than access to a CD-ROM, there is no point in using the hard disk as a cache. Accordingly, it is desirable to minimize fragmentation of a hard disk area being used for cache.

As a high capacity cache will take a significant period of time to fill up, it is desirous to preserve the cache contents in the event of media changes (e.g., CD-ROM changes) and power shutdowns. Accordingly, there is a need for a non-volatile cache and a need for associating stored data with a particular CD-ROM.

SUMMARY OF THE INVENTION

According to the invention, a cache for improving access to optical media includes a primary cache and a secondary cache wherein the primary cache is formed by RAM and the secondary cache is formed by a portion (i.e., all or less than all space) of a hard disk memory.

According to one aspect of the invention, discrimination methodology is implemented for determining when optical media data should not be cached. Under certain conditions, caching of data transfers does not improve access to optical media data. For example, if a data transfer from CD-ROM exceeds a critical sustained throughput rate, then caching is not likely to improve access time. Thus, such transfer is not cached. Under an alternate condition, if the estimated time to complete an optical media data request is within a specific percentage of the estimated time to complete a hard drive disk request, then the benefit may be insignificant. Again, such request is not cached.

According to another aspect of the invention, fragmentation of data stored on the hard disk portion of cache is minimized by imposing storage constraints. As fragmentation deteriorates hard drive access time, fragmentation is minimized and avoided. To do so, entire CD-ROM requests are stored in contiguous sectors on the hard drive. Also, sequential CD-ROM requests to adjacent sectors of the CD-ROM are concatenated on the hard drive, so that the multiple CD-ROM requests are stored in contiguous sectors of the hard drive. Data redundancy in the cache is even permitted because it leads to avoidance of fragmentation. Redundant data is stored when the data already exists in cache among overlapping (i.e., in two or more stored requests), non-aligned (i.e., starts at different location than either of overlapping requests) storage requests. Lastly, compounding fragmentation symptomatic of conventional discard schemes is avoided by implementing first-in first-out criteria for overwriting cache locations.

According to another aspect of the invention, cache updates are performed in parallel to both primary and secondary cache.

According to another aspect of the invention, data stored in cache is associated with a specific optical disk to avoid invalidating data when optical disks are changed and re-changed. Specifically, a tag is defined for each sector of optical disk stored in cache. The tag is formed by combining the data's optical disk sector number with an index corresponding to an assigned optical disk number. The optical disk number is assigned from root directory and header information unique to the optical disk.

According to another aspect of the invention, integrity of data stored in non-volatile secondary cache is maintained across power failures and shutdowns. According to a preferred embodiment, all cached data in non-volatile memory is valid upon recovery except a relatively small portion (e.g., 254 KB out of 20 MB or larger cache file).

According to alternative embodiments of the invention, technologies other than the preferred RAM and hard disk structures can be used for primary cache and secondary cache. The constraint for defining the structural technologies is that the primary cache have an access time as fast or faster than secondary cache and that the secondary cache have either one or both of a faster access time or faster transfer speed rating than the optical storage device. For example, flash memory or bubble memory could be used for primary cache, while flash memory, bubble memory or a faster read-write optical drive could be used for secondary cache. According to another embodiment, a single level high-capacity cache (e.g., portion of hard disk drive) is implemented for accessing an optical media.

One advantage of this invention is that average data access times for optical media can be improved for many microcomputer multimedia, hypermedia, animation and other video, audio-video and graphical applications. Another advantage is that the cache structure can be implemented with existing resources on a microcomputer by allocating a portion of system RAM and a portion of a user's hard drive. Cache implementation software defines the cache structure and controls operation. By implementing a high-capacity cache filled up over a period of hours or weeks and maintaining the integrity of cache data across shutdowns and CD-ROM swaps, performance improvements are maintained over the long term, (rather than following a latent period of use after each "power on" or "media swap"). Accordingly, a cost-efficient, technically-effective cache is implemented for improving access times for optical storage media.

The invention, its aspects and advantages will be better understood by reference to the following detailed description taken in conjunction with the accompanying drawings.

BRIEF DESCRIPTION OF THE DRAWINGS

FIG. 2 is a block diagram of the memory subsystem and processor of the environment of FIG. 1.

FIG. 3 is a block diagram of the optical media cache according to one embodiment of this invention.

FIG. 4 is a block diagram of a CD-ROM cache embodiment of this invention.

FIG. 5 is a diagram of track layout for a CD-ROM.

FIG. 6 is a flow chart of the cache implementation software according to one embodiment of this invention.

FIG. 9 is a flow chart of data discrimination processing according to yet another embodiment of this invention.

FIG. 10 is a diagram showing the relationship between a transfer key variable and (i) a directory of CD-ROM identification codes, (ii) CD-ROM sector layout and (iii) hashing tables, according to an embodiment of this invention.

DESCRIPTION OF SPECIFIC EMBODIMENTS

Exemplary Environments for the optical Media Cache

Figure 1:
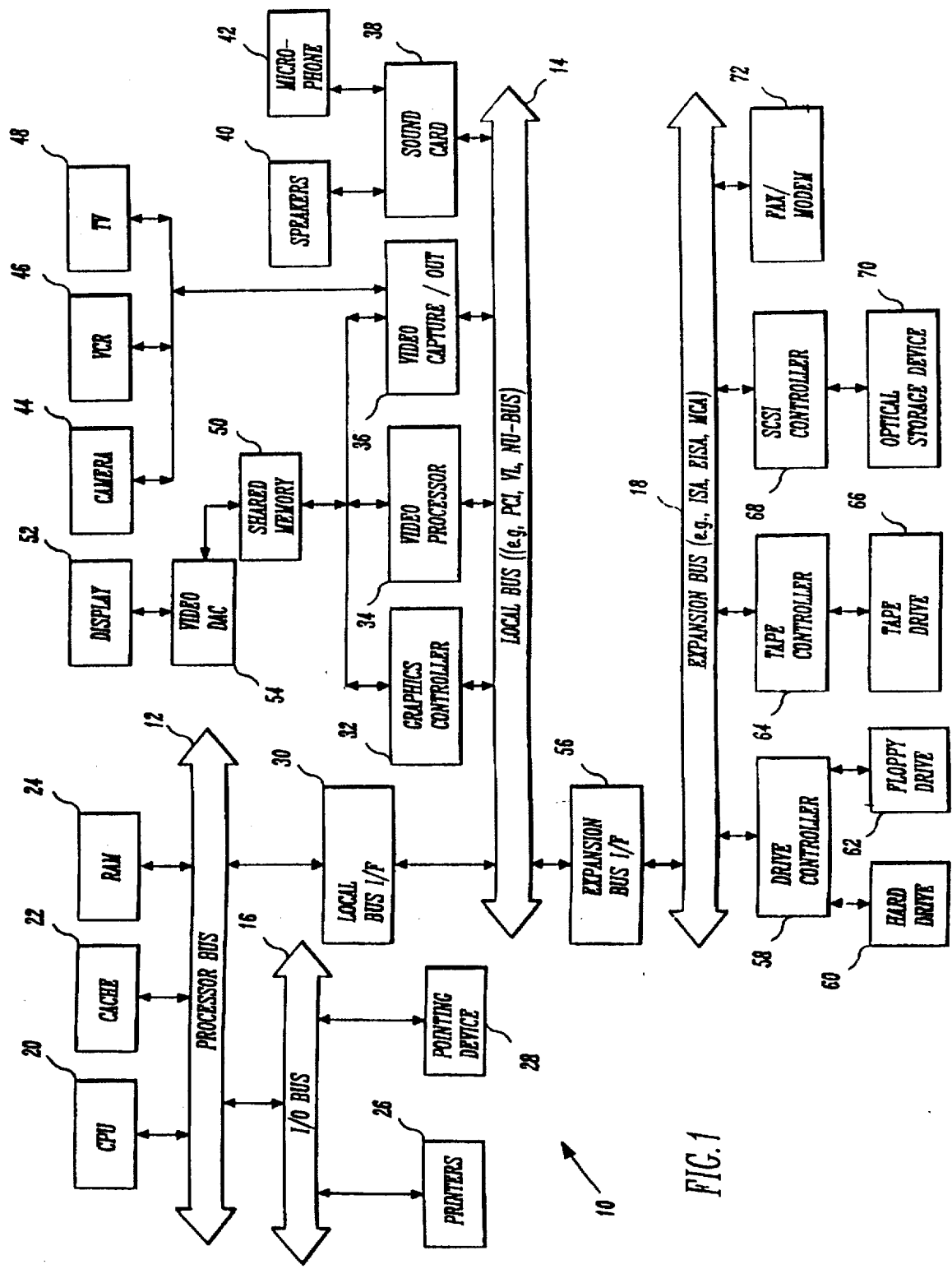
FIG. 1 is a block diagram of an exemplary microcomputer system environment for hosting the optical media cache of this invention.

FIG. 1 shows a microcomputer system architecture 10 which would benefit from the optical media cache of this invention. The microcomputer 10 includes a central processing unit 20, system memory (e.g., 22, 24), multiple communication busses 12, 14, 16, 18 and several system components and peripherals. The microcomputer 10 may be a work station, personal computer, or any of several other standardized and proprietary general purpose or embedded microcomputers. The number and types of communication busses, system components and peripherals may vary. For the microcomputer 10 shown, there is a processor bus 12, local bus 14, I/O bus 16 and expansion bus 18. A CPU 20, external cache 22 and system RAM 24 are located on the processor bus. An I/O bus 16 is linked to the processor bus 12 for interfacing to I/O ports. A printer 26 and pointing device 28 (e.g., mouse) typically are coupled to the I/O bus 16 via I/O ports (not shown).

A local bus 14 is linked to the processor bus 12 via a local bus interface 30. Exemplary local busses are the video local (VL) or VESA-standard bus, the peripheral component interface (PCI) bus and the NU-BUS. The PCI bus, for example, may couple up to 10 peripheral devices. Illustrated are a graphics controller 32, video processor 34, video capture/output card 36 and a sound card 38. Such peripherals are used in multimedia and audio-video production systems. Speakers 40 and a microphone 42 are linked to the sound card. A camera 44 (e.g., camcorder), VCR 46 and TV 48 are linked to the video capture/output card 36. The video subsystems 32, 34, 36 typically share a local memory resource (i.e., frame buffer or video RAM) 50. Information is passed to a display 52 from the video subsystems and shared memory 50 via a video DAC 54.

An expansion bus 18 is linked to the processor bus 12 via the local bus 14 and an expansion bus interface 56. Peripherals, system components and mass storage devices typically are coupled to the expansion bus 18. Shown are a drive controller 58 coupling to a hard disk drive 60 and a floppy disk drive 62, a tape controller 64 coupling to a tape drive 66, a SCSI controller 68 coupling to an optical storage device 70 or other SCSI peripheral, and a fax/modem 72. As an alternative to the SCSI controller 68, any of several proprietary controllers also may couple to an optical storage device 70. According to other architectures the hard drive 60 and/or the optical storage device 70 (e.g., CD-ROM) and there respective controllers instead may be coupled to the local bus 14.

In summary, the optical media cache of this invention may benefit many alternative single or multiple microprocessor based architectures 10, including proprietary work stations, personal computers, PENTIUM machines, APPLE MACINTOSH machines, and other machines currently available or to come based on the Intel 80X86 architecture, Motorola 68XXX architecture, other CISC processor architectures, and oncoming RISC processor and multiprocessor architectures.

Memory Subsystem and Optical Media Cache

FIG. 2 shows an exemplary memory subsystem 80 supporting the CPU 20 of architecture 10. In one embodiment, the CPU 20 includes a processing unit 82, registers 84, a memory management unit 86 and an internal cache 88. A memory subsystem includes system RAM 88, external cache 90 and mass storage devices 92. The mass storage devices 92 shown include CD-ROM 70, hard disk drive 60 and floppy disk drive 62. Access times to data increase in order among the following storage mechanisms: registers 84, internal cache 86, external cache 90 and RAM 88, hard drive 60, CD-ROM 70, and floppy drive 62. Thus, data from a mass storage device 92 typically is transferred into RAM 88 or external cache 90 then internal cache 88 and registers 84 for access by the processor 82. More specifically, high throughput processing is best achieved by having data already in internal cache 88, external cache 90 or RAM 88 when the processor 82 needs it.

According to one embodiment, the optical media cache 100 of this invention is implemented using RAM 88 (and/or external cache 90) and hard disk drive 60. As shown in FIG. 3, a portion of RAM 88 is allocated to serve as a primary cache 102 and a portion of hard disk drive 60 is allocated to serve as secondary cache 104. The function of the optical media cache 100 is to improve access time to data stored on a CD-ROM or other optical media data source 70.

According to alternative embodiments of the optical media cache, other technologies can be used for primary cache 102 and secondary cache 104 than the preferred RAM 88 (and/or external cache 90) and hard disk 60 structures. The constraint for defining the cache levels is that the primary cache 102 have an access time as fast or faster than the secondary cache 104 and that the secondary cache 104 have a faster access time than the optical medium 70. For example, flash memory or bubble memory could be used for primary cache 102, while flash memory, bubble memory or a faster read-write optical drive could be used for secondary memory 104. According to yet another embodiment the smaller primary cache may be omitted in lieu of a single-level high-capacity cache structure.

According to a preferred embodiment, the primary cache 102 provides 0.5 MB to 2 MB of storage, while the secondary cache 104 provides at least 10 MB of storage (e.g., 20 MB to 140 MB). For the structure of FIG. 3, the secondary cache 104 is formed from an area of hard drive 60. For a DOS-based machine, such area is formed as a DOS file or a DOS partition. According to other operating systems, the area may be formed by a file, object or other operating system or user mechanism for dedicating address space to the secondary cache 104. Regardless of the operating system, it is preferable when possible that physical address space be allocated as secondary cache 104 so that the cache implementation software can avoid fragmentation of stored data.

Problems Addressed and Solutions Derived

In deriving the optical media cache, several problems were addressed, such as how can an optical media's average access time be improved in light of the advancing needs of multimedia, hypermedia, video and animation applications. According to the invention, access time is improved by implementing a cache structure. Due to the cost-effectiveness of hard drives and the expense of RAM, a dual level cache structure comprising a smaller primary RAM cache and larger secondary hard drive cache is preferred. Using the 90/10 or 80/20 rule of thumb, 90% (80%) of the time is spent using 10% (20%) of the data. Thus, for a 680 MB CD-ROM, 68 MB or 136 MB is expected to serve as an adequate cache capacity. A secondary cache capacity of approximately 100 MB is preferred (or more generally, a capacity between 20 MB and 140 MB is preferred).

Several implementation problems of a high-capacity hard drive cache also are addressed by this invention. To optimize performance it would be useful to cache only the frequently accessed data. In addition, for a hard drive to be effective as a cache, it needs to maintain a faster access time than the optical media. According to conventional caches used for improving access to a hard disk, all data transfers are cached. As a result, the conventional cache improves performance only some of the time. If all CD-ROM transfers were cached, the primary cache and even the secondary cache would become cluttered with some of the 90% (80%) of the data that is only accessed (on average) 10% (20%) of the time. Such an implementation raises concerns as to whether performance deteriorates once the secondary cache is filled and overwritten; and whether the optical media cache expense precludes a less than optimal implementation. These concerns are dealt with by addressing the problem of how can the hard drive be implemented as a cache in an effective manner. Another problem addressed is how can CD-ROM access time be improved over an extended period of use.

To implement the hard drive as a cache in an effective manner, data discrimination methodologies are adopted. Specifically, conditions are defined for determining when not to cache optical media data transfer requests. In brief, it is intended that transfers not be cached when caching does not improve performance. Ideally, the data not cached would be the data accessed during that 10% (20%) of the time.

To maintain the hard drive at a faster access time and/or transfer rate than the CD-ROM over an extended period of use, storage constraints are defined. Specifically, there is a problem with fragmenting storage in a hard drive. If the cached data is fragmented, then the access time to such data increases. It may increase to the point that the 10:1 advantage in access time favoring the hard drive deteriorates to less than 1:1 (i.e., access to hard drive becomes as slow or slower than access to CD-ROM). Accordingly, the hard drive preferably is implemented as a contiguous area of hard drive physical address space. In addition, data from a CD-ROM data request is stored in contiguous sectors on the hard drive to avoid fragmentation.

With a high capacity cache, another problem is the latent period of time before the improved performance is realized. For example, with a 680 MB CD-ROM it may take several hours of use before a significant portion of the cache is filled. It would be inefficient to suffer such latency every time one powers up or swaps optical media. To address the media swapping problem, tags are defined using media disk information. In addition a directory of data for multiple optical disks is maintained in cache. The tag includes an identifier unique to the CD-ROM or other optical media disk from which the associated data came. When a CD-ROM is swapped, then re-swapped, the original data is still in cache and valid. According to one embodiment a FIFO method of filling cache is implemented.

To address the power shutdown problem, directory information in secondary (non-volatile) cache is updated periodically to identify any active portion of primary cache. In the event of a power failure or shutdown, data stored in non-volatile secondary cache remains valid.

To recover after a power failure/shutdown, the cache file is examined to reconstruct control variables. Cached data is stored in the cache file within groups. At power on, the last active group is identified. As data is written into the cache file in a FIFO manner, by finding the last active group, the place to start loading new data is found. Thus, a quick effective, recovery scheme is implemented. At most one group of data (i.e., the last active group) is lost.

Cache Implementation
Overview:

The optical media cache 100 is implemented for a CD-ROM 70 according to a preferred embodiment. FIG. 3 shows a partial block diagram of a microcomputer system implementing the CD-ROM cache 100. Application programs requiring data from CD-ROM 70 are executed by CPU 20. The CPU 20 controls data flow by directing video data to a video processor 34, audio data to a sound card 38 and graphics data to a graphics controller 32. Typically, the CPU 20 processes conventional program data. Accordingly, there may be four data streams (i.e., program data, video data, audio data and graphics data). Full motion video, for example, may require a throughput of 30–60 MB per second for an application with 24-bit color, 2.3 MB/frame (without compression) and updating at 30 frames per second (fps). Typically, the video data is compressed to achieve the sustained throughput necessary for clear full-motion video. Sound may require another 10 MB per second throughput before compression. To achieve the necessary sustained throughput, companies are optimizing performance in many areas. FIG. 5 shows the layout of a conventional CD-ROM 106. A storage track 108 spirals around and in toward the center of the disk. To optimize performance, programmers estimate frequently accessed portions and store it near the center of the disk 106. Data near the center can be accessed more quickly than data at the outer edge. In addition video compression and audio compression techniques are frequently used so that less data is needed to develop a video image or audio sound clip. The contribution of this invention is to provide an optical media cache for storing frequently accessed data in a faster storage medium.

FIG. 6 shows a flow chart for processing a CD-ROM request 112 according to an embodiment of this invention. Application programs requiring data from CD-ROM 70 trigger CD-ROM requests enabling access of data stored on a CD-ROM. Such data may be on the CD-ROM 70 or already stored in the CD-ROM cache 100. A utility program or operating system service 110 (i.e., the cache implementation software) is executed to implement the CD-ROM request 112. Typically, a total of one CD-ROM sector may be accessed with a single CD-ROM request. According to the embodiment of FIG. 6, data discrimination processing is performed at step 114 to determine at step 116 whether the CD-ROM request should use the CD-ROM cache 100. According to alternative embodiments, cache 100 is not used (1) when transfers occurring during a prior window of time (e.g., 1 second) have occurred at a rate exceeding a critical sustained throughput rate (e.g., 40 KB/sec); or (2) when an estimated time to complete a CD-ROM data request is within a specific percentage (e.g., 25%) of the estimated time to complete a hard drive disk request.

If cache 100 is not used for this data transfer, then at step 118 data is transferred from CD-ROM to RAM 24 or a processing unit for processing (e.g., to CPU 20, graphics processor 32, video processor 34, or audio processor 38). The request is then complete at step 120.

If cache 100 is used for this data transfer, then a look-up key is derived at step 122. The key is formed from an index and a sector number. The index points to an entry in a directory table specifying a particular CD-ROM. In one embodiment, the directory table holds a value for each of up to 255 CD-ROM disks. Such value is formed from data unique to the corresponding CD-ROM disk. Thus, the key identifies the CD-ROM disk and sector of the data requested via the data request. If the data is already present in the CD-ROM cache 100, the key translates to a starting location in primary and/or secondary cache using a conventional hashing table technique. Specifically, at step 124 primary cache is tested to see if all the desired CD-ROM data is already present in primary cache 102. If so, then at step 126 the data is read from primary cache 102 completing the request at step 120. In the event that only some of the data is found, in one embodiment the request is modified to request the remainder of data. Alternatively, the entire data request is passed on to check secondary cache 104. If all the data is not present in primary cache 102, then the secondary cache is tested at step 128 to determine whether all or the remaining data is present in secondary cache. If so, then at step 130 such data is read from secondary cache 104. At step 132 the data from secondary cache 104 is combined with the data from primary cache 102, if any. The request is then complete at step 120.

In one embodiment, partial hits are supported. In such case, the remainder of the data request, if any, is processed to access the remaining data from the CD-ROM 70 at step 134. At step 136, such data is then combined with the data from primary cache 102 and secondary cache 104, if any. If partial hits are not supported, the entire data request is passed to check secondary cache 104 or CD-ROM 70 to complete the request. The cache 100 is then updated to store the data request at step 138. According to a preferred embodiment, primary and secondary caches 102, 104 are updated in parallel. Conventional hashing tables, binary trees or balanced trees are alternative methods of maintaining cross-referencing between CD-ROM and cache locations. According to a preferred embodiment, when cache 102 or 104 fills up, data is discarded from the respective cache using a first-in first-out criteria. Alternatively, a least-recently-used or usage-count criteria is implemented instead. The request is then complete at step 120.

Following is more detail on data discrimination processing (step 114), the key protocol (step 122), and cache update processing (step 138).

Figure 8:
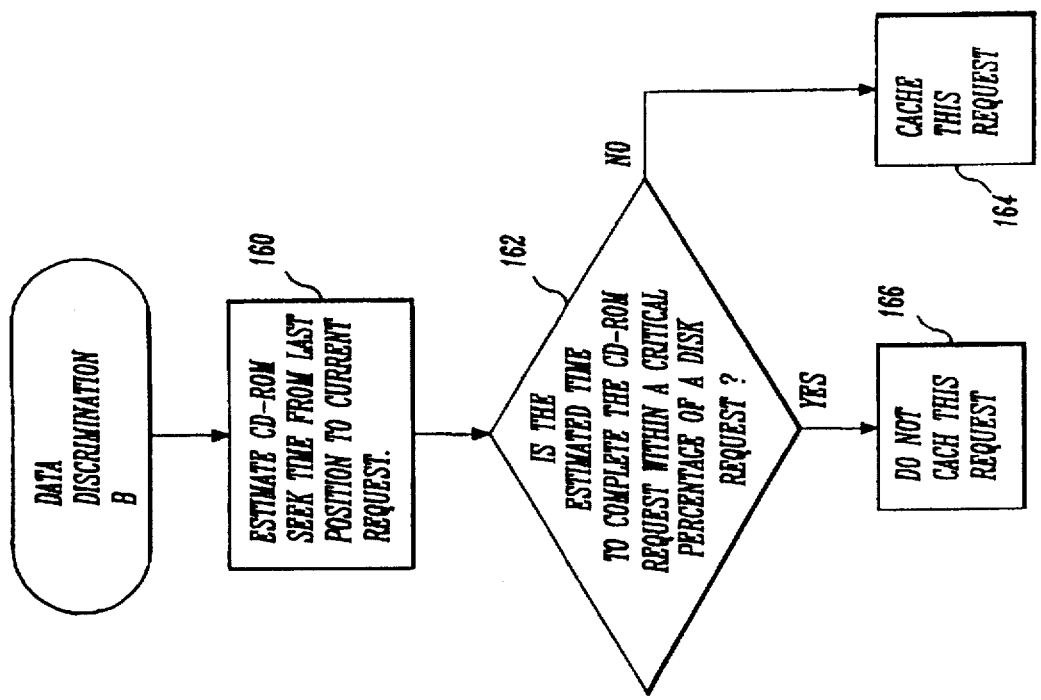
FIG. 8 is a flow chart of data discrimination processing according to another embodiment of this invention.
Figure 7:
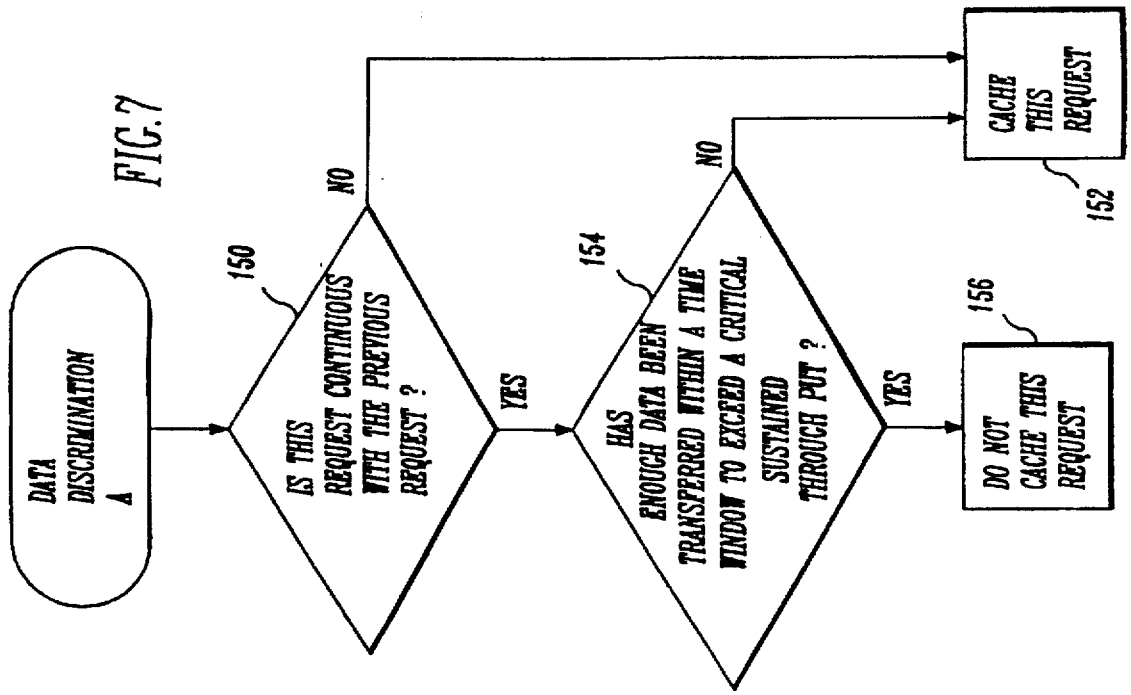
FIG. 7 is a flow chart of data discrimination processing according to one embodiment of this invention.

Data Discrimination Processing (Step 114):

FIGS. 7–9 are flow charts for three alternative discrimination processing embodiments. Referring to FIG. 7, data discrimination processing embodiment A is shown. At step 150 the data request is analyzed to determine whether the data is contiguous with data from the previous request. Data is contiguous if it is in a CD-ROM sector adjacent to the last sector from the previous data request. If not contiguous, the data is cached as designated at step 152. If contiguous, then at step 154 the software checks to see if data is being transferred at a rate exceeding a critical sustained throughput. If yes, then cache is unlikely to improve performance so the request is not cached, as designated by step 156. If no, then the request is cached, as designated by step 152.

Referring to FIG. 8, data discrimination processing embodiment B is shown. At step 160, the CD-ROM access time is estimated based on the respective sector locations of the previous request and the current request. At step 162 the estimated access time is tested to determine if it is within a specific percentage (e.g., 25%) of a hard disk access time. If not within such percentage, then the request is cached as designated at step 164. If within such percentage, then the request is not cached as designated at step 166.

Referring to FIG. 9, data discrimination processing embodiment C is shown. At step 170, the CD-ROM sector of the data specified in the current request is compared to the sector position of the previous request to determine whether the request will have a small seek time. If not close enough, then the request is cached as designated at step 172. If close enough, then at step 174 the data transfer rate is tested to determine if enough data has been transferred within a time window (e.g., 1 sec) to exceed a critical sustained throughput. If not exceeding the critical sustained throughput, then the request is cached, as designated at step 172. If exceeding the critical sustained throughput, then the request is not cached, as designated at step 176.

Deriving the Transfer Key (Step 122):

Accessing data in cache 100 is done via a look-up key 180. As data is to be preserved across power failures, power shutdowns and media changes, the key includes information as to the specific CD-ROM disk and sector for which the data request is directed. The key itself is a 32-bit variable.

Referring to FIG. 10, in one embodiment the eight highest-order bits serve as an index 182 into a CD-ROM directory 184 located in non-volatile secondary cache 104. The remaining 24-bits 186 designate the CD-ROM sector 188 to which the request is directed. The allocation and number of bits can be varied to support additional CD-ROMS.

The eight-bit index portion points to an entry in a 256 entry directory 184. The 256 entry directory enables cache 100 to store data for up to 255 CD-ROM disks. One entry 188 (e.g., the last entry) is reserved to designate that the CD-ROM drive is empty or contains an unidentifiable disk. Other entries provide a CD-ROM identification code for identifying a unique CD-ROM disk. Each identification code stored in the directory is 64 bytes long. The first 60 bytes are taken as the first 60 bytes in a specific sector of a CD-ROM disk (e.g., sector 16—a typical header or directory sector). The last 4 bytes represent a checksum of such sector.

The key index 182 points to the CD-ROM identification code for the current disk. When the index points to the last entry (i.e., entry location representing no disk or unidentified disk), the cache 100 is disabled.

Upon a CD-ROM request for which Cache 100 is active, the look-up key is derived. The highest-order 8-bits are determined by the current index. Such index is changed whenever the CD-ROM is changed. The lowest order 24-bits are determined from the sector address within the data request. The key then is used to determine whether the requested data is already in primary cache 102 or secondary cache 104. In one embodiment conventional hashing tables 190 are used for translating the look-up key to corresponding locations in cache 100. In other embodiments, binary trees or balanced trees are used.

Figure 11:
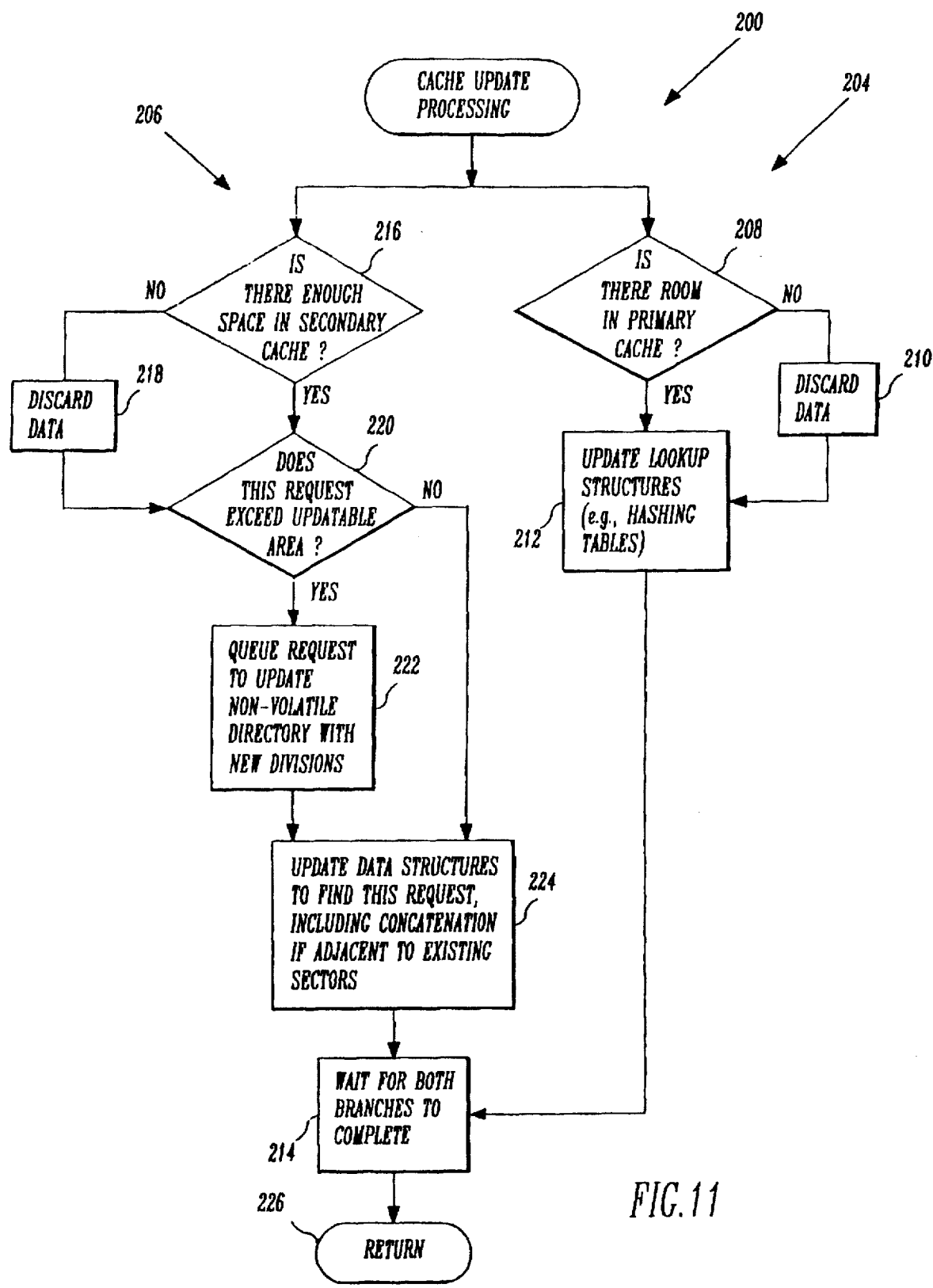
FIG. 11 is a flow chart of cache update processing according to a parallel update embodiment of this invention.
Figure 12:
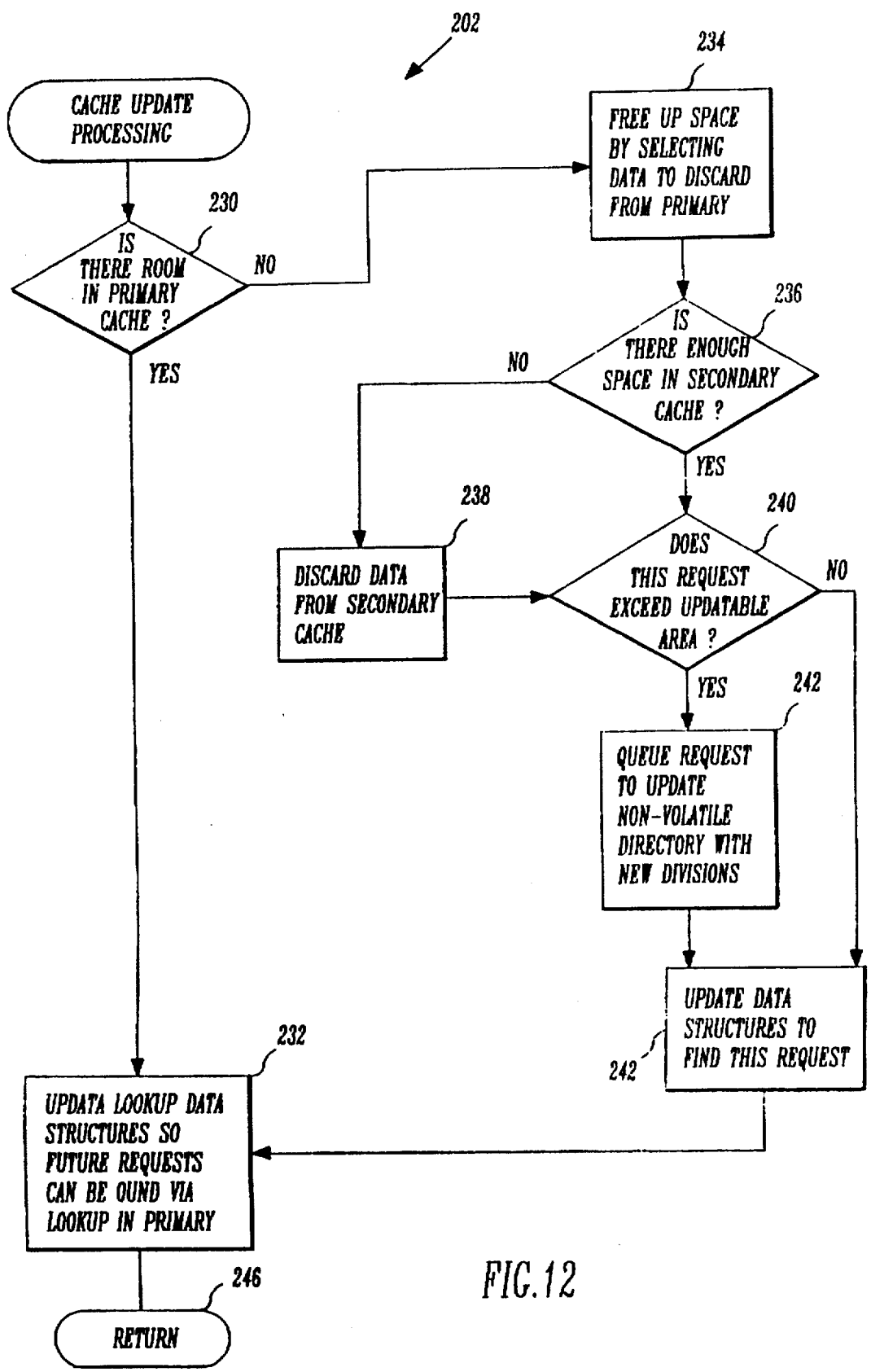
FIG. 12 is a flow chart of cache update processing according to a two-stage update embodiment of this invention.

Cache Update Processing (Step 138):

FIGS. 11 and 12 show flow charts for alternative cache update processing 138 embodiments. FIG. 11 is directed to a parallel update process 200, while FIG. 12 is directed to a two-stage update process 202. Referring to FIG. 11 primary and secondary caches 102, 104 are updated in parallel. Two branches 204, 206 are executed during parallel update processing. Referring to primary cache processing branch 204, primary cache look-up tables are tested at step 208 to determine whether there is enough room in primary cache 102 to store the data request. If there is not enough room, then at step 210 the data is discarded. At step 212 the look-up tables (e.g., hashing tables) are updated. If there is room in cache 102, then the look-up tables are updated at step 212. The primary cache update branch 204 processing then is complete. At step 214, there is a wait for the secondary cache processing branch 206 to complete, if not already completed.

Referring to secondary cache processing branch 206, secondary cache look-up tables are tested at step 216 to determine whether there is room in secondary cache 104 to store the data request. If not enough room, then the data is discarded at step 218. Thereafter, or directly if there is enough space in secondary cache 104, the request is tested at step 220 to determine whether it exceeds the updatable area. If the updatable area is exceeded, then at step 222 a request is queued to update the non-volatile directory with the new divisions. Thereafter, or directly if the request does not exceed the updatable area the data structures (e.g., hashing tables) are updated at step 224 so this request can be found during future accesses. Additionally, the data is checked to see if it is adjacent to pre-existing data. If so, the new data is concatenated with the pre-existing data. In one embodiment data is written to physical sectors of the hard drive secondary cache. In another embodiment tolerating fragmentation, a conventional file system is used for writing and organizing data in cache. The secondary cache update branch 206 processing then is complete. At step 214, there is a wait for the primary cache branch 204 processing to complete, if not already completed. When both branches 204, 206 are complete cache update processing returns at step 226.

FIG. 12 shows a two-stage update process embodiment. At step 230, the primary cache look-up tables are tested to determine whether there is enough room in primary cache 102 to store the data request. If enough room (i.e., yes), then at step 232 the look-up table (e.g., hashing table) structures are updated for enabling future access to the data. If not enough room (i.e., no), then at step 234 some data in primary cache 102 is discarded to make room for the request. According to alternative embodiments, first-in first-out, least-recently-used or usage-count criteria are used to determine which data to discard. Then, at step 236 secondary cache look-up tables (e.g., hashing tables) are tested to determine whether there is enough room in secondary cache 104 to store the request. If not enough room (i.e., no), then at step 238 some data is discarded from secondary cache 104 to make room. Again, according to alternative embodiments first-in first-out, least-recently-used or usage-count criteria are used to determine which data to discard. After data is discarded (step 238) or directly after testing the space availability in secondary cache (step 236 answered yes), the request is tested at step 240 to determine whether the request exceeds the updatable area (i.e., crosses over into write-protected area). If exceeded (i.e., yes), then at step 242 the request is queued to update the non-volatile directory (e.g., portion of look-up table structures) with new divisions (i.e., boundaries between updatable and write-protected areas). After queuing (step 242) or directly after testing (i.e., step 240 answered no), the secondary cache data structures are updated at step 244 to enable future access to the data. Then, at step 232 the primary cache look-up data structures are updated to enable future access to the data. Cache update processing for the data request is then complete at step 246.

Data Integrity Processing:

As previously described, according to a preferred embodiment the cache 100 includes non-volatile memory space. Thus, the contents of such space are not lost after a power failure or power shutdown. According to one aspect of the invention, steps are taken to maintain such data as valid even after such a power failure or shutdown. In particular, in the preferred embodiment secondary cache is updated whenever primary cache is updated. In addition, directory tables for the cache are copied from primary cache into secondary cache periodically to assure valid data as of at least the last copy of such information into secondary cache 104. According to one embodiment, the copying is performed as needed within cache update processing 200, 202 at steps 220, 222 or steps 240, 242. According to a preferred embodiment, the directory information (i.e., DIRECTORY SECTORS) are copied into secondary cache, each time a group of a specified number (e.g., 127) of CD ROM sectors are written into secondary cache 104.

Data integrity steps also are taken to maintain valid cached data through media changes. As previously described, a directory of CD-ROM identification codes is stored in secondary cache 104. Data for up to 255 CD-ROMs is maintained. A variable indicating the current CD-ROM, if any, is maintained for indexing into this table. Whenever a CD-ROM is removed, an interrupt routine changes the current CD-ROM variable to indicate no CD-ROM is present. Whenever, a CD-ROM is inserted, an interrupt routine calculates the CD-ROM identification code from information on the CD-ROM, then scans the directory to see if the code is already present in secondary cache 104. If present the index to the code is found and used for deriving the key variable during future data requests. If not present the identification code is stored in the directory at the next available index number.

Avoiding Fragmentation in Secondary Cache 104:

Preferably, all fragmentation is to be avoided within secondary cache 104 so as to optimize cache access times. As there is no significant time penalty for fragmentation in RAM-based primary cache 102, conventional storing mechanisms are used for primary cache 102.

In the commercial embodiment, secondary cache 104 is allocated as a DOS file by the DOS operating system. DOS is most likely to allocate the file as several discontiguous physical address areas. Thus, at the start the file already is fragmented. It is an aspect of this invention to minimize fragmentation by the operating system and avoid schemes in which fragmentation compounds on itself. To avoid having the operating system add to the initial fragmentation, the cache file is defined as a write-protected hidden file. With such attributes, DOS will not allow the file to be moved around in physical address space.

To avoid fragmentation during normal operation, controls are implemented. First, when storing data in cache 104, the prior data request CD-ROM sectors are tracked to determine whether the current request is for data adjacent to the data from a prior request within an active group of the cache file. If so, it is concatenated to the prior data so that the data is contiguous in physical address space within the cache file. In addition, if a subsequent data request is for data which overlaps two data requests without sharing a common starting sector, then the requested data is stored together in physical address within the cache file. The existing data remains in cache and is valid. Thus, parts of the cache file may include redundant data. Such practice improves average access time by making it more likely to have a complete hit in cache (rather than partial hits).

In addition, to avoid compounding fragmentation as occurs using time-based discard mechanisms, a modified first-in first-out (FIFO) discard method is used for updating the cache file. For a completely contiguous cache file, the first data written in is the first data discarded once the cache file fills. However, for an initially fragmented cache file (i.e., DOS file) the FIFO scheme is modified so that a data request is not fragmented between two of the non-contiguous areas of physical address space. For example, if the cache file is formed by 3 separate physical address spaces, a data request is not divided to be stored in more than one such area. When the first area is being overwritten and a data request occurs which will not fit in the remaining space of the first area, the entire data request is written at the beginning of the second area. The FIFO scheme is considered to be a "modified" FIFO scheme because a subsequent data request will be tested to determine whether it can fit within the residual portion of the first data area. If it fits, it is stored there. If not, it is stored in the second area overwriting the next portion based on FIFO criteria.

Cache Implementation Software

Pseudo-code for portions of the cache implementation software is included as appendix A. Cache implementation software is a system service utility for creating and maintaining the CD-ROM cache 100. The appendix includes four parts. Part 1 is pseudo-code for defining data structures for a DOS file embodiment of cache 100 located on a hard drive 60. The structures are defined at initialization, including recovery after a power failure/shutdown and start-up. Part 2 is the pseudo-code for defining support for multiple CD-ROMs. Part 3 is the pseudo-code entry for servicing a data request Part 4 is pseudo-code for the portion of a data request service relating to updating cache in a manner which avoids fragmentation.

In a preferred embodiment, the cache implementation software is written in C language with in-line assembly code in a manner providing fast, efficient device driver code as would be appreciated by a programmer skilled in the art of DOS device driver design. Conventional cache features (e.g. read ahead) and configuration procedures (e.g. installation menu with options) are included.

Figure 13:
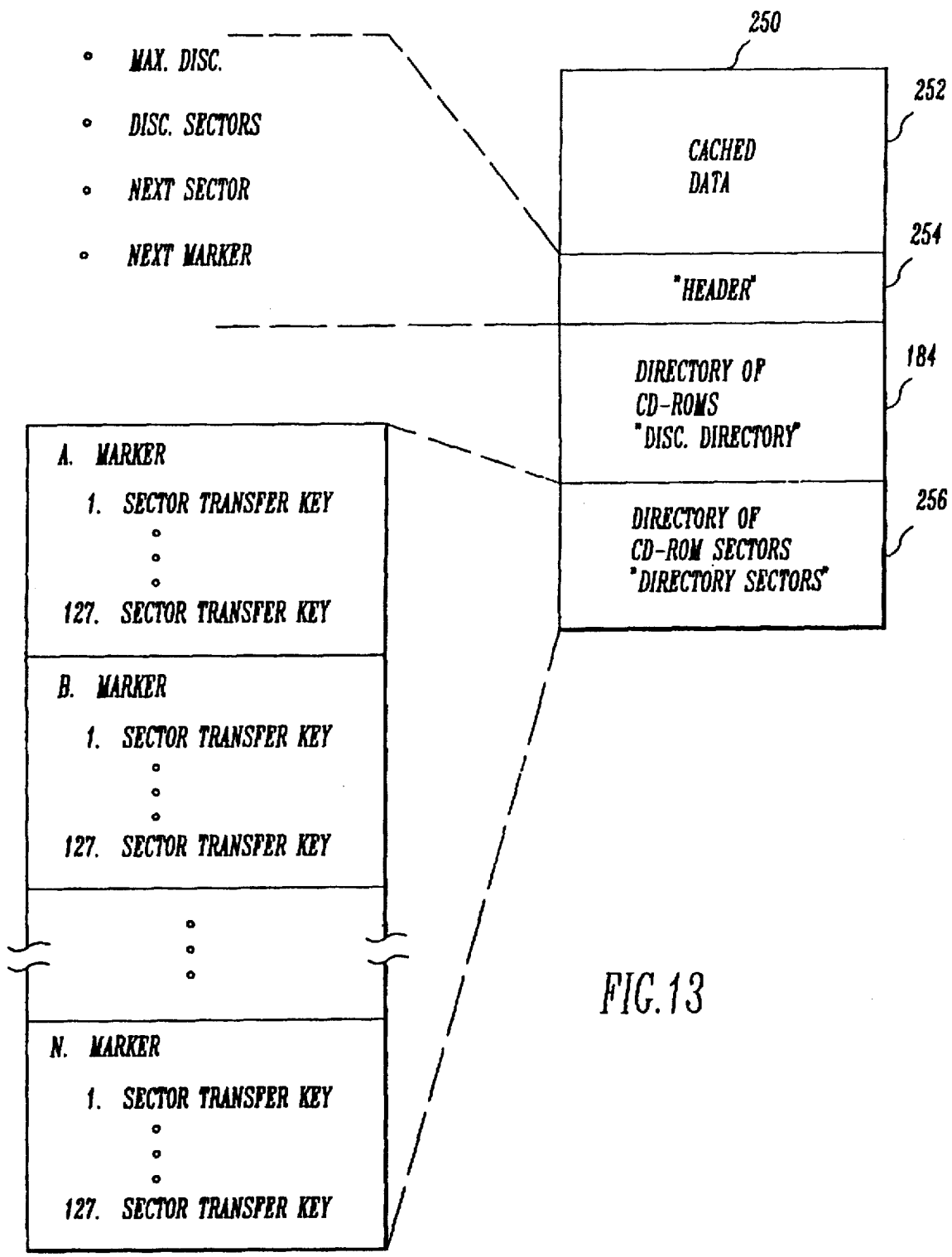
FIG. 13 is a logical diagram of the cache file according to one embodiment of this invention.

Initialization/Recovery (See Appendix Part 1):

At power-up an initialization routine checks to determine whether a DOS cache-file has previously been defined. If not, then a file is created and parameters are set at initial values. If the file already exists, then this is an entry following a power failure or a power shutdown. FIG. 13 shows a logical diagram of the cache-file 250 serving as cache 100 or secondary cache 104. The file includes a cached data area 252, a header 254, a directory of CD-ROMs 184 (see FIG. 10 also), and a directory of CD-ROM sectors 256.

The header 254 includes variables MAX_DISC, DISCSECTORS, NEXTSECTOR and NEXTMARKER. MAX_DISC is the next index value to assign in CD-ROM directory 184. DISCSECTORS is the number of logical disc sectors used in the cached data area 252. NEXTSECTOR is the next logical sector in the cached data area 252 for storing data. NEXTMARKER is the next value to use as a marker for adding entries into the directory of CD-ROM sectors 256.

The directory of CD-ROMs 184 is described with regard to part 2 of the appendix and is previously described in the section "Deriving the Transfer Key" (FIG. 10).

The directory 256 of CD-ROM sectors correlates cached data to CD-ROM sector addresses and is the mechanism for recovering non-volatile cache contents after a power failure or power shutdown. The cached data area 252 is managed so as to have a single 127-sector area active at one time. This area is referred to as an active group. The area corresponds to the size of 127 CD-ROM sectors. Once an active group is filled, a marker is calculated and transfer keys for each of the 127 sectors are copied into the directory 256 of sectors. If a power failure/shutdown occurs before the area fills up, then the data in the active area is invalid on recovery. As a result, only a small portion of cache is lost after a power failure or startup. The loss is taken as a tradeoff on speed. The directory 256 of sectors could be updated with every sector write into cache data area 252. This, however, would double the work resulting in slower performance. To achieve desirable speed, the sector transfer key are written in the directory 256 only after the active area fills. At such time a marker is calculated by using the NEXTMARKER value from the header 184, then incrementing the NEXTMARKER value for a subsequent access.

Because the hard drive at which file 250 is stored is non-volatile, the contents of a file survive a power loss. As described above, however, the active group in area 252 is invalid upon recovery. This is because values are not stored in the directory 256 after each update of area 252. As variables in the header 254 also may have changed before closure of the last active group, only the MAX_DISC value of header 254 is taken to be valid. Thus, DISCSECTORS, NEXTSECTOR, and NEXTMARKER are to be derived upon recovery. Once derived, such information is used to derive hashing tables or other cross-referencing look-up tables for storage in primary cache 102.

The value for DISCSECTORS is derived by allocating the DOS FAT table to determine the cache file size, then subtracting out the DIRECTORY SECTOR size and correcting for CD-ROM DIRECTORY and HEADER space. NEXTMARKER is derived by scanning through the directory 256 of CD-ROM sectors to find the last group entered. As markers are assigned in incremental order, the last group is the one before a non-successive marker number (e.g., for groups with markers 112, 113, 114, 2, 3 the last group written had marker 114.) The NEXTMARKER then is stored as the successive number (e.g., 115). NEXTSECTOR then is derived by identifying the offset from the start of the DIRECTORY SECTORS. The cache data area and DIRECTORY SECTOR area have a one-to-one correspondence. Thus, by identifying the NEXTMARKER, the NEXTSECTOR is easily identified. With the header information derived, the data in area 252, header 254, DISC_DIRECTORY 184 and DIRECTORY SECTORS 256 are available for normal operation once look-up table structures (e.g., hashing tables) are derived and stored in primary cache 102.

Maintain Support For Multiple CD-ROMS: (See Appendix Part 2)

Upon initialization/recovery, the CD-ROM drive 68 is tested to see if a CD-ROM 70 is present. If present, then its identification code is read/derived and the DISC_DIRECTORY 184 tested to identify a current CD-ROM index value, and if needed a new MAX_DISC value. If not present, then the index indicates no disk present (i.e., cache disabled).

In the coded embodiment, the CD-ROM identification code is 64 bytes long. The first 60 bytes are set to be the first 60 bytes of sector 16 of the CD-ROM. This typically is header information for the CD-ROM and is likely to be unique to a given CD_ROM. However, to provide additional means of avoiding redundant codes, the last four bytes of the code are set as the checksum value of such sector 16. The derived code for the current CD-ROM is stored in the CD-ROM directory 184. The directory 184 is scanned to see if it has already been stored. If it has, then the current index is set at the index to such previously stored value. If not, then the next available index is assigned, and MAX_DISC is incremented to point to the now next available directory location.

Each time a change in media is detected (via interrupt), the code for supporting multiple CD-ROMs is executed to identify a current CD-ROM, if any.

Data Request Service: (See Appendix Part 3)

With the cache 100 created or recovered and a current CD-ROM identified, normal operation of cache 100 follows. In one embodiment, the cache 100 is active when a valid CD-ROM is loaded. On occasion, however, the cache 100 may be inactivated by data discrimination processing (i.e., discriminator determines current data request is not to be cached). Other criteria also may be implemented to inactivate the cache 100.

For normal operation, an application program running on a host microcomputer will request data from CD-ROM. Typically this is executed as an I/O read call to the operating system. The cache implementation software of this invention hooks into the operating system as a system service/utility to process the data request.

Function check_cache is called every CD-ROM I/O to determine whether the sectors of requested data are already in Cache 100. Lower level routines in_cache and in_disk_ cache check the primary cache 102 for a hit and secondary cache 104 for a hit. Routines add_cache and add_disk_cache add data to the respective caches 102, 104 and update look-up tables to enable future access.

Check_cache implements data discriminator embodiment A (see FIG. 7). Throughput of data transfers from CD-ROM are monitored by counting a variable TICKS. Variables first_sector and next_sector are maintained to determine whether sequential data requests are for contiguous data. If so, then the data is stored in contiguous sectors on the hard disk to avoid fragmentation.

Avoiding Fragmentation: (See Appendix Part 4)

For the coded embodiment, secondary cache 104 is formed as a DOS file. A problem of using the conventional DOS file system is that fragmentation of the cache file can occur. This would ultimately lead to the need for defragmenting the file system, which could take many minutes. If defragmentation of the cache file were performed, each multiple sector cd rom request would end up becoming a large number of different disk requests. Since each disk request involves a seek of the head and a rotational latency, which typically combines to take 20 milliseconds, the overall throughput from the disk drive will gradually degrade to become worse than the CD-ROM drive. In one embodiment an entire DOS partition is allocated to the cache file. Such approach is impractical, however, for upgrading existing systems which already have all of the physical disk space allocated to existing partitions. In the implemented embodiment, initial fragmentation (created by the operating system) is accepted, but additional fragmentation is avoided. Avoiding additional fragmentation is achieved by allocating disk space via the file system, then write protecting the space so it will not be moved around by the operating system. By setting the DOS attributes for the cache file to be SYSTEM and HIDDEN and READ-ONLY, DOS does not further fragment the cache file. It even prevents defragmenters from moving the allocated physical sectors around.

To avoid compounding fragmentation when discarding data, additional methods are employed. When the cache file fills up, already existing data is overwritten so that the new data can be stored. In one embodiment space allocation discard algorithms are implemented. According to a first fit algorithm, space is scanned for the first already allocated area which is large enough to contain the current request. Such algorithm usually does not create additional fragmentation. In still another alternative embodiment, an exact fit algorithm is implemented to find a previously allocated area of exactly the same size would not create fragmentation. The problem with these fit-based algorithms are that they add processing overhead to the cache implementation, and fall-back cases are needed when space of an appropriate size is not found.

In the implemented (preferred) embodiment, a modified first-in first-out discard criteria is used. Such an approach is fast in that it does not fail to find space. It also has the advantage of providing synergy with the initialization methods to enable fast cache recovery upon start-up (See Appendix Part 1 for recovery procedure). Still another benefit of the FIFO implementation is that the entire cache file needs to be filled completely before the current sector will be re-used.

Because the cache file may have initial fragmentation, the FIFO method as implemented is modified so that a data request is not fragmented between two non-contiguous areas of the cache file 250's physical address space. For example, if the cache file 250 is formed by 3 separate physical address spaces, a data request is not divided to be stored in more than one such area. If overwriting the first area when a data request will not fit in such area's remaining physical address space, the entire data request is instead written at the beginning of the second area. The FIFO scheme is considered to be a modified FIFO scheme because a subsequent data request will be tested to determine whether it can fit within the residual portion of the first data area. If it fits, it is stored there. If it does not fit, it is stored in the second area overwriting the next available portion using the same FIFO criteria.

To detect fragmentation at the physical level, the file system is bypassed after the cache file 250 is created. As a result, DOS's file allocation table (FAT table) is accessed to determine the actual physical layout of the file created by DOS. Once the physical layout is available, it is possible to detect if a request will fit in a physically contiguous manner. As discussed above, a first fit then can be performed in the modified FIFO approach. In the case where the cache file is very fragmented, usage of the cache file will be sub-optimal, but performance will be very close to a non-fragmented file since the only additional overhead would be the first fit scan at the physical level (this has the same number of disk I/O's).

Another problem is the potential for logical address space fragmentation caused by a users data access pattern. This happens when CD-ROM requests occur out of sequence or where the access pattern is different the second time the same sectors are accessed. Consider the following sequence:

10 sectors from 1000
10 sectors from 1020
10 sectors from 1010
10 sectors from 1005

The last request for 10 sectors from 1005 would not be contiguous at the logical sector level. Logical level fragmentation of the cache file occurs when placing non-contiguous cd rom sectors adjacent to each other. To avoid logical fragmentation, these sectors are to be stored contiguously even though every sector is already in the cache. This is an unusual approach with surprising benefit. Conventionally it is considered inefficient to store redundant information. However, by doing so the data is available from one data request storage area. This results in faster access than if the data were pieced together from 2 request storages. Fortunately, such access patterns are rare and should continue to be rare so permitting redundancy is not likely to introduce significant inefficiencies conventionally concerned with.

Meritorious and Advantageous Effects

One meritorious effect of this invention is to improve access time to data stored on optical storage media. This provides particular advantage for multimedia, hypermedia, animation and other multiple data stream applications. Another advantage is that the cache structure can be implemented with existing resources on a microcomputer by allocating a portion of system RAM and a portion of a user's hard drive. Cache implementation software defines the cache structure and controls operation. By implementing a high-capacity cache filled up over a period of hours or weeks and maintaining the integrity of cache data across shutdowns and CD-ROM swaps, performance improvements are maintained over the long term, (rather than following a latent period of use after each "power on" or "media swap"). Accordingly, a cost-efficient, technically-effective cache is implemented for improving access times for optical storage media.

Alternative Embodiments

According to alternative embodiments of the invention various configurations and feature subsets may be implemented. For example, a single stage high capacity cache may be implemented using a portion of the hard disk drive 70 or another high-capacity data structure.

In addition, in an embodiment in which the hard drive portion is allocated via a DOS file, more fragmentation of cached data occurs than when allocating physical address space directly. In some embodiments, data integrity across power failures and media changes is not supported.

Although the preferred embodiment is for accessing a CD-ROM, other optical media including "floptical" drives, Bernoulli drives, WORM drives, CD-I drives and magneto-optical drives may be used with the high capacity cache according to embodiments of this invention.

Although embodiments are described for a cache file or secondary cache of 10 MB or 20 MB to 140 MB, the upper limit on size is open-ended.

Accordingly, although a preferred embodiment of the invention has been illustrated and described, various alternatives, modifications and equivalents may be used. Therefore, the foregoing description should not be taken as limiting the scope of the inventions which are defined by the appended claims.

APPENDIX A

Pseudo-code listing for Implementing Cache

© 1994, Ballard Synergy Corporation (Unpublished)

```
                                   31
/*                           PART 1
INITIALIZE / RECOVER HARD-DISC-CACHE FILE (DOS-file Embodiment)

There are 4 different parts to the disk based cache
   file.  The bulk of it is the cached data itself, it is followed
   by a directory header, which is followed by the DISC_DIRECTORY
   data structure, which is followed by directory sectors.  The
   directory header contains values which are used by the disk
   based caching code.  The only field which survives across
   reboots is the max_disc field, which is used to assign the next
   CD-ROM DISC number.  The DISC_DIRECTORY contains the 64 bytes
   per DISC and the directory sectors contain the logical sector
   to cd rom sector mapping tables.  The cd rom sector number is
   actually a composite of the CD-ROM disc number and the actual
   cd rom sector.  Each directory sector contains a marker and 127
   cd rom sector numbers.  Each cd rom sector number maps directly
   to the cached data contained at the beginning of the file.

FILE LAYOUT:

CACHED DATA         4 x 512 byte sectors for each
                                      CD-ROM sector cached
                  DIRECTORY HEADER    See struct directory below
                  DISC_DIRECTORY      See Part 2
                  DIRECTORY SECTORS   One 512 byte sector for each 127
                                      CD-ROM sectors
                        4 byte marker
                        127 x 4 byte CD-ROM sector numbers
                            1 byte DISC number + 3 byte actual sector
                            number
*/
#define DIRHEADERSIZE 4       /* size of directory header */
#define DIRSIZE 36            /* size of directory header +
DISC_SECTORS
*/
```

32

```
/*
        The directory structure is computed during initialization
   for the disk based caching code to use.  Currently only the
   max_disc field is used as is.  The described embodiment
   supports 255 different CD-ROM discs, but this can be
   changed by scanning the directory sectors during boot and
   re-assigning DISC numbers and computing max_disc.  This will
   make it unneccesary to save and restore the directory header to
   disk.  It will also allow support of an arbitrary number of
   CD-ROM discs over the course of time with the only limitation
   being 255 discs at any one time.]

DIR.disksectors equal to the number of cd rom sectors
   cached * 4.  It is the maximum value of logical disk sectors
   for the cached data area.

DIR.nextsector is the next logical sector which is the
   starting point for finding free space or space to allocate in
   the cached data area.
        DIR.max_disc is the next DISC number to be used DIR.marker is the next directory sector marker value to be
   used
        The marker at the beginning of each directory sector is
   the key to the method in which we recreate the state of the
   data structures as they were prior to system shutdown (or
   crash).  At any one time there is one active group of 127 cd
   sectors worth of the cache data area.  Once this area is
   modified or deemed to be undesirable, the directory sector
   corresponding to the group of 127 is written to the file.  When
   the system is shutdown and restarted, the active group at
   shutdown will be found and re-activated as the first active
   group after initialization.  Since the most amount of data that
   can be cached and then forgotten under normal circumstances is
   126 cd rom sectors, this provides a very small amount of data
```

33 that will have to be re-cached relative to the overall size of
the cache data file.

Another big advantage to this method is that there is only
one extra 512 byte sector write for every 254K bytes of data
cached.

Due to the fact that the marker of the adjacent sector is
one greater than the previous sector, we can detect the active
sector by scanning all of the directory sector's markers and
finding a pair with non-incrementing markers.
*/

```c
struct directory
{
        ushort  max_disc;       /* next DISC number to use */
        ulong   disksectors;    /* cd_sectors cached * 4 */
        ulong   nextsector;     /* 0 to disksectors-1 */
        ulong   marker;         /* next ID number to use for a
                                   directory sector
*/
        ...
} DIR;
```

/*
The Init(filesize) function is called once during
initialization. It is responsible for setting up all data
structures, especially the ones to support the disk based
caching. The filesize parameter is the DOS file size of the
cache data file.

The key first step is to compute the number of CD-ROM
sectors cached in the data area. Multiplying this number by 4
gives us DIR.disksectors. Once this is known, we can easily
compute the correct offsets for the different parts of the
file.

The directory header is read in to retrieve the number of
different CD-ROM discs encoded in the DISC_DIRECTORY. Then the
DISC_DIRECTORY is retrieved from the disk file. Finally, the
directory sectors are read in and DIR.nextsector and DIR.marker are computed while the disk caching data structures are
re-created.
*/

```c
    int Init(ulong filesize)
    {
            ulong disksector;   /* used for logical to physical sector
                                    conversion */
            ulong cd_sectors;   /* the number of cd sectors cached in
                                    the data area */
            ulong variable_size;/* the size of the file which varies
                                    by cd_sectors */
            ulong tablesize;    /* the number of directory sectors */
            uchar sectorbuf[512];/* storage for a single disk sector*/
            ushort i;           /* loop counter */
            ulong table_entries;/* loop counter while initializing
                                    disk data structure*/
            uchar wrapped = 0;  /* flag to indicate if the markers
                                    have wrapped around*/
            last_marker = 0;    /* value of the previous directory
                                    sector's marker */

/* subtract the directory and marker which have constant
            size. The 4 bytes are for the extra marker, since the sector
            starts with one */
            variable_size = filesize - DIRSIZE*512 - 4;

/* since each cd rom sector is 2048 bytes and there is a
            ulong for each sector, the first estimate for the size needs to
            divide by 2052 */
            cd_sectors = variable_size / 2052L;

/* the reason that the above computation of cd_sectors is
            not always correct is that there is 4/127'th of a byte for each
            cd rom sector occupied by the marker in each directory sector,
            this means that for large files, 4/127'ths could become a large
            number. We are not concerned with execution efficiency since
```

```
        this needs to be done only once at initialization.  A simple
        serial search is done */
             for (i=0; i<30000; i++)
             {
                 /* compute the actual size of the variable portion of
                 the file */
                 tablesize = cd_sectors*2052L + (4 * cd_sectors)/127;

/* if it is the same as what we have from before, we
                 have found it */
                 if ( tablesize == variable_size )
                     break;         /* this usually happens on the
                                       first iteration */

             /* try the next value if we don't have an exact match*/
                 cd_sectors++;
             }
             if ( i == 30000 )    /* if we get to this value, we have no
                                     match */
                 return(ERROR);

DIR.disksectors = cd_sectors * 4;  /* convert to 512 byte
                                                   sector count */

             /* the directory starts right after the cache data.  The
        first part is the directory header which contains the directory
        structure */
             disksector = DIR.disksectors;
             real_sector(&disksector);     /* convert to physical
                                              sector number */
             diskread(&DIR,disksector,DIRHEADERSIZE); /* read header
                                                         from file */

/* if the disksectors value from the file is not the same,
        we abort */
             if ( DIR.disksectors != cd_sectors * 4 )
                 return(ERROR);
```

36

```
       /* now DIR.disksectors and DIR.max_disc are set properly,
    we can read in the DISC_DIRECTORY from the file. It starts
    right after header */
          disksector = DIR.disksectors + DIRHEADERSIZE;
          real_sector(&disksector);     /* convert to physical */
          diskread(DISC_DIRECTORY,disksector,DIRSIZE-DIRHEADERSIZE);
    /* read in */

/* initialize the directory header values to proper
    defaults */
          DIR.nextsector = 0;
          DIR.marker = 1;

for (table_entries=0; table_entries<cd_sectors;
    table_entries+=127)
          {
                 if ( (table_entries%127) == 0 )    /* sectorbuf is
                                                       all used up */
                 {
                      /* compute logical sector to read in next */
                      disksector = DIR.disksectors + DIRSIZE +
    table_entries/127;
                      real_sector(&disksector);     /* convert to
                                                       physical */
                      diskread(sectorbuf,disksector,1);/* read it in*/
                 }

/* look at the marker to find the active directory
    sector */
                 if ( *(ulong *)sectorbuf == 0 )    /* initial value
                                                       of marker */
                 {
                      if ( wrapped ) /* illegal to have wrapped and
                                        unused area */
                           return(ERROR);

else /* we have found the active one */
                      {
```

37
```
                /* set the nextsector to the beginning of this
                group */
                        DIR.nextsector = table_entries * 4;

/* set the marker to one more than the
                previous one */
                        DIR.marker = last_marker+1;

break;   /* all done */
                }

/* mark all entries from this directory sector
        as illegal this is because the corresponding data area has
        never been used*/
                        for (i=1; i<128; i++)
                        {
                                /* add_cd_sector() will update the data
                                structures so that future access can be
                                made by the disk functions */
                                add_cd_sector(ILLEGAL_SECTOR);

/* since we are blocking by 127, make sure
                                we don't overrun */
                                if ( table_entries+i >= cd_sectors )
                                        break;
                        }
                        /* once we have found a directory sector with a
                        0 value */
                        /* anything other than 0 is an illegal value */
                        last_marker = ILLEGAL_SECTOR;
                }
        /*  If the marker does not equal one more than the previous
        marker we might have found the active directory sector */
                else if ( *(ulong *)sectorbuf != last_marker+1 )
                {
                /* if we have already wrapped or found a 0 marker, we
                abort */
                        if ( wrapped || last_marker == ILLEGAL_SECTOR )
```

```
                        38
        {
            DIR.nextsector = 0;
            return(ERROR);
        }
        else /* ignore active area */
        {
            /* if this is not the first directory
            sector, we set wrapped */
            if ( table_entries )
                wrapped = 1;

/* set the nextsector to the beginning of
            this group */
            DIR.nextsector = table_entries * 4;

/* set the marker to one more than the
            previous one */
            DIR.marker = last_marker+1;

/* start a new marker sequence starting at
            the current value */
            last_marker = *(ulong *)sectorbuf;

/* mark all entries from this directory
            sector as illegal we do this to protect us
            against any power failures corruputing the
            integrity of the cached data in the active
            group */
            for (i=1; i<128; i++)
            {
            /* add_cd_sector() will update the data
            structures so that future access can be
            made by the disk functions */
                add_cd_sector(ILLEGAL_SECTOR);

/* since we are blocking, make sure we
            don't overrun */
                if ( table_entries+i >= cd_sectors )
```

```
                                    39
                                 break;
                         }
                     }
                 }
          else /* update marker to the current directory
      sector's */
             {
                 last_marker = *(ulong *)sectorbuf;

             /* we need to add all the cd sectors in this group to
             the disk data structure. */
                 for (i=1; i<128; i++)
                 {
                     add_cd_sector(*(ulong *)(sectorbuf+i*4));
                 /* since we are blocking by 127, make sure we
                 don't overrun */
                     if ( table_entries+i >= cd_sectors )
                         break;
                 }
             }
         }

/* do any other initialization that is necessary */
         ...
         return(INITIALIZED_OK);
      }

/*
          add_disk_cache() is called whenever it is determined that
      adding data to the disk cache is desired.  Only the portion of
      this function which deals with the directory updating will be
      detailed.  The rest uses standard data structure update and
      accesses.
      */
      add_disk_cache()
      {
```

```

/* tableindex is the index of the directory sector which
   is active at the beginning of this function.  508 is used
   because it is 4 * 127.  The marker is 4 bytes which add up to
   standard 512 bytes */
         ulong tableindex = DIR.nextsector / 508;

...

/* do standard processing to allocate disk space from the
   active group potentially advancing to subsequent groups. Data
   structure updates will be performed here. [see Appendix at Part
   4] */

...

/* at the end of all the processing, we check to see if
   the active group of 127 cd sectors has advanced */
         if ( DIR.nextsector/508 != tableindex )
         {
             /* if it has, we update the directory sectors for all
   the directory sectors before the current one.  Under normal
   circumstances only one directory sector will be written
   the code is written to handle extreme cases where very large
   requests are processed or areas of the disk file are skipped
   due to allocation selectiveness */
             while ( 1 )
             {
                 /* call the function which updates the directory
                 sector */
                 update_dir(tableindex*127);

             /* increment the index to the next directory sector */
                 tableindex++;

/* check to see if we get past the last directory sector */
                 if ( tableindex >= DIR.disksectors/508+1 )
                 {
                     /* reset the index to the beginning */
                     tableindex = 0;
                 }
```

```
                                41
            /* if the index is the active sector, we stop */
            if ( tableindex == DIR.nextsector/508 )
                    break;
        }
      }
    }

/*
          update_dir() is called to update a directory sector which
    contains a 4 byte marker and 127 cd sector numbers.  Each cd
    sector number is 4 bytes and represents an 8 bit disc number
    and a 24 bit cd-rom sector number. */ void update_dir(ulong cdsectors)
    {
          ulong disksector;

/* compute the logical disk sector by skipping past the
    cache data and the directory header and CD-ROM disc directory
    and index into the appropriate directory sector */
          disksector = DIR.disksectors + DIRSIZE + cdsectors/127;

real_sector(&disksector);    /* convert logical sector to
                                          physical sector */
          *(ulong *)sectorbuf = DIR.marker++; /* assign marker to
    directory sector */

/* get 127 CD sector numbers which comprise this directory
    sector */
          get_direntry(&sectorbuf[sizeof(ulong)],cdsectors,127);
          diskwrite(sectorbuf,disksector,1); /* write to disk */
    }

*******************************
    LOW LEVEL UTILITY FUNCTIONS
    *******************************
```

42

```
        get_direntry(ulong *buffer,ulong sector_number,ushort count)
        copies count number of cd sector numbers to the specified
        buffer.

       put_direntry(...) copies the other way from get_direntry()

real_sector(ulong *disksector) converts the logical disksector
        to the actual physical sector number usable by the low level
        diskwrite/diskread functions.
        diskwrite() and diskread() write/read physical sectors using
        standard PC INT 13h functions.  The cylinder/head/sector
        mapping details are hidden from the caller.  The sector number
        is a physical sector number relative to the beginning of the
        disk drive.  The number of 512 byte sectors is specified.

add_cd_sector(cdsector) is responsible for updating the disk
        caching data structures so that future queries to find the
        cdsector will be able to.  The order that add_cd_sector() is
        called determines the location of the cdsector which is passed
        in.  The first one corresponds to the first 2048 bytes of the
        cached data area of the file.  The second call represents
        the second 2K bytes, etc.

        ************************************************************

/*
                write_dir() is called whenever a new CD-ROM disc is
        detected. [See the appendix at part 2]
        */ void write_dir()
        {
                ulong disksector;
                /* the directory starts right after the cache data.  The
        first part is the directory header which contains the directory
        structure */
```

```
                                    43
        disksector = DIR.disksectors;

real_sector(&disksector);      /* convert to physical
                                          sector number */
        diskwrite(&DIR,disksector,DIRHEADERSIZE);    /* write to
                                                        disk */

/* the DISC_DIRECTORY buffer is immediately after the
    directory header */
        disksector = DIR.disksectors + DIRHEADERSIZE;
        real_sector(&disksector);      /* convert to physical
                                          sector number */
        diskwrite(DISC_DIRECTORY,disksector,32);    /* write to
                                                        disk */
15  }
```

44

```
/*                        PART 2
                SUPPORT FOR MULTIPLE CD-ROM DISCS

The key to implementing support for multiple CD-ROM discs in a
        single cache data area is to have a global variable called:
        CURRENT_DISC.  This variable is a 32 bit value with the most
        significant 8 bits representing the current CD-ROM disc index.
        This index is an offset into a directory which contains data
        which is unique to a particular CD-ROM disc.  64 bytes are
        allocated to identify each CD-ROM disc, 60 bytes being the
        first 60 bytes of sector 16 and 4 bytes being the checksum for
        sector 16.  The value of FF000000 hex, represents no media in
        the CD-ROM drive or an unidentified disc in the CD-ROM drive.
        In either of these cases, caching to the disk is disabled.  If
        it is not this value, the CURRENT_DISC value is or'ed with the
        requested sector value (which is guaranteed to be less than 24
        bits).  This way sector 16 from different discs will be sector:
        XX000010 hex, where XX is the disc index.  This allows support
        of up to 255 different discs at a time. */
        /* The following is a code fragment from In_Disk_Cache
        (cd_sector) which returns YES if the cd_sector is in the Disk
        Cache and NO if not */
        In_Disk_Cache(cd_sector)
        {
            if ( CURRENT_DISC == 0xFF000000 )
                return(NO)
            cd_sector |= CURRENT_DISC;

            ...
            /* continue normal processing using the new cd_sector */
            /* different discs will never have overlapping cd_sector
               values*/
        }
        /* respond_to_change() is called whenever a media change is
        detected. */
        void respond_to_change()
```

```
        CURRENT_DISC = 0xff000000;
        ...
        /* do any other appropriate processing */
    }

/* Process_Sector(cd_sector) is called after the cd_sector is
    read into transfer_address from the CD-ROM drive */ long DISC_DIRECTORY[256][16]; /* Global directory for DISC's */

Process_Sector(cd_sector,transfer_address)
    {
        int i,j;                /* loop counters */
        long sum;               /* checksum value */
        if ( cd_sector == 0x10 )    /first sector read from CD-ROM
    disc*/
        {
            /* calculate custom CRC for each 32 bit long */
            for (j=sum=0; j<CD_SECTOR_SIZE/4; j++)
                sum = ((sum<<1) ' transfer_address[j]) | (sum>>31);

/* search sequetially until we find a match */
            for (i=0; i<DIR.max_disc; i++)
            {
                /* compare the first 60 bytes, unless we don't
                   match */
                for (j=0; j<15; j++)
                    if ( DISC_DIRECTORY[i][j] !=
    transfer_address[j] )
                        break;

/*if the first 60 bytes matched and the checksum matches*/
                if ( j == 15 && DISC_DIRECTORY[i][15] == sum )
                {
                /* we found the current disc in the directory */
                    CURRENT_DISC = (ulong)i << 24;
```

```
                                    46
                break;
            }
        }
        /* if i gets all the way to DIR.max_disc, we didn't find a
   match */
        if ( i == DIR.max_disc && DIR.max_disc < 255 )
        {
            /* allocate a new disc index */
            DIR.max_disc++;

/* set CURRENT_DISC to old DIR.max_disc */
            CURRENT_DISC = (ulong)i << 24;

/* copy appropriate information into DISC_DIRECTORY */
            for (j=0; j<15; j++)
                DISC_DIRECTORY[i][j] = transfer_address[j];
            DISC_DIRECTORY[i][15] = sum;
                write_dir(); /* update directory on disk file */
        }
    }
    ...
    /* do rest of processing */
}
```

```
                                        47
/*                                   PART 3
                              SERVICING A DATA REQUEST

Check_cache() is the function which is called every CD-ROM I/O
        to see if the requested sectors are already in the cache.  The
        return value is the number of CD-ROM sectors which were found
        at the beginning of the request.  Partial cache hits not
        starting at the beginning of the request are not supported in
        this embodiment since in practice they are relatively rare and
        they would possibly result in splitting up the request into two
        separate requests.

TICKS is a global variable which is incremented every 1/18th of
        a second during the PC timer interrupt.
        LAST_TICK is the value of TICKS during the last time
        check_cache() was called CRITICAL_RATE is an externally specified value which specifies
        the cutoff transfer rate which is used to potentially disable
        the disk cache.  It works in conjunctions with CRITICAL_TICKS.

CRITICAL_TICKS is an externally specified value which is in
        units of 1/18th of a second.  Its significance is that if the
        CRITICAL_RATE has been sustained for CRITICAL_TICKS, the disk
        cache is disabled for that I/O.  If CRITICAL_TICKS
        is equal to 0, then the transfer rate discriminator is
        disabled.

       THROUGHPUT is the calculated throughput in kilo bytes per
        second.

START_TICK is the value of TICKS at the beginning of the
        current range of "sequential" requests.
        FIRST_SECTOR is the value of cd_sector at the beginning of the
        current range of "sequential" requests.
```

48

NEXT_SECTOR is the sector which would make this request
contiguous on the CD-ROM disc to the last request. The current
implementation enforces a very strict rule that NEXT_SECTOR
must be exactly adjacent to the previous request. It is
possible to relax this condition a bit and tolerate a
relatively small forward gap.

"sequential" requests means that starting at FIRST_SECTOR
occuring at START_TICK, all subsequent requests have been
adjacent using the NEXT_SECTOR test. In this implementation,
this means contiguous on the CD-ROM disc.

If SKIPPED is set after calling check_cache(), the disk cache
is disabled for this I/O. This is used by the cache program to
make sure that it is not added to the disk cache.

The following are lower level functions which are used by
check_cache():

in_cache(transfer_address,cd_sector,count) is the function
which checks the RAM cache for a cache hit. It returns the
number of sectors that were found at the beginning of the
request.

add_cache(transfer_address,cd_sector,count) is the function
which adds data to the RAM cache so that future calls to
in_cache() will find the data in_disk_cache(transfer_address,cd_sector,count) is the function
which checks the DISK cache for a cache hit. It returns the
number of sectors that were found at the beginning of the
request.

add_cache() and add_disk_cache() will be called when
appropriate by the cache program upon completion of the actual
I/O by the CD-ROM drive.

```
                                        49
check_cache(cd_sector,count,transfer_address)
        {
                int n;                  /* the number of cd sectors found
                                           in RAM + disk cache */
                int diskn;              /* the number of sectors found in
                                           the disk cache */
                long throughput;        /* temporary storage for transfer
                                           rate calculations */

                SKIPPED = 0;            /* the default is to enable the
                                           disk cache */ if ( CRITICAL_TICKS != 0 )   /* if it is 0, disable
                                                discriminator */
                {
                /* The following check computes the number of ticks
        64K of data used at the CRITICAL_RATE would take.  If more than
        that many ticks have elapsed since the last request, we make
        sure that the disk cache will be enabled for this I/O.  We also
        synchronize future rate computations to this I/O request.  */
                if ( (TICKS-LAST_TICK) > (64L * 18L)/CRITICAL_RATE )
                        {
        synchronize:
                        THROUGHPUT = 0;   /* this guarantees disk
                                             cache is enabled */
                        START_TICK = TICKS; /* make this request the
                                               start of range */
                        FIRST_SECTOR = cd_sector;/*ditto for cd_sector*/
                        }
                /* this is the strict test for adjacency.  It can be
        relaxed somewhat via "cd_sector < NEXT_SECTOR || cd_sector >
        NEXT_SECTOR+delta" where delta is a relatively small number
        such as 15      */
                else if ( cd_sector != NEXT_SECTOR )
                        {
                        /* if we fail the NEXT_SECTOR test, synchronize */
                                goto synchronize;
                        }
```

```
/* we need to compute the cumulative transfer rate */
else
{
        /*
                It is possible for I/O's to happen during
        the same tick.  In this case, we approximate
        that it happened 2/3 of a tick after the last
        I/O.  Since each cd sector is 2 kilobytes one
        sector in a tick is 36 kilobytes per second ==>
        one sector in 2/3 of a tick is 54 kilobytes per
        second.
                The value of 2/3 is somewhat arbitrary, but
        it is not that critical since this is only for
        the very few I/O's all happening during the same
        tick of the range.
                In the normal case that the starting tick
        of the range is one or more ticks before now, we
        ignore the partial tick and simple use the
        difference.  Again since the CRITICAL_RATE can
        be set arbitrarily, the slight variance from
        computed kilobytes per second versus actual is
        not that important.  The important thing is to
        always use the same method to calculate the
        throughput.  In any event over long periods of
        time, the importance of the fractional tick
        diminishes to zero.                         */
        if ( TICKS == START_TICK )
                throughput = (cd_sector-FIRST_SECTOR) * 54;
        else
                throughput =
((cd_sector-FIRST_SECTOR)*36)/(TICKS-START_TICK));

/*
                If we ever dip below the critical transfer
        rate, we synchronize to the current I/O.  It is
        also possible to be a little more lenient and
        keep a moving average of the most recent
        transfer rates.  this would work better, but due
```

```
                                51
        to execution speed requirements on 386 machines,
        we are using a method which is very fast to
        compute                 */
        if ( throughput < CRITICAL_RATE )
                goto synchronize;
        else
                THROUGHPUT = throughput;  /* set THROUGHPUT
                                             to current value*/

}
        LAST_TICK = TICKS;               /* set LAST_TICK
                                            to "now" */
        NEXT_SECTOR = cd_sector + count; /* NEXT_SECTOR is
                                            right past this I/O */
        /*      The following is the big test of sustained
                througput exceeding a critical rate for a
                critical amount of time   */
        if ( THROUGHPUT > CRITICAL_RATE && (TICKS-START_TICK)
   > CRITICAL_TICKS )
                {
                /*   if we meet these conditions, disable the disk
                cache for this I/O*/
                        SKIPPED = 1;
                }
        }

/* check the RAM cache for a cache hit */
        if ( (n=in_cache(transfer_address,cd_sector,count)) != 0 )
        {
                /* if all of the sectors were found, we are done */
                if ( n == count )
                        return(count);
                /* if we get here, we need to adjust the request for
                subsequent cache accesses */
                transfer_address += n * 2048; /* skip data buffer
                                                 which is used */
                cd_sector += n;    /* skip past on CD-ROM disc */
```

```
                            52
            count -= n;          /* adjust remaining cd_sectors */
        }

/* if SKIPPED is set, we need to disable the disk cache */
        if ( SKIPPED == 0 )
        {
            /* see how many cd sectors are in the disk cache */
            diskn =
    in_disk_cache(transfer_address,cd_sector,count);
            /* the following is an optional step, it adds the
            data found in the disk cache to the RAM cache.  It
            can be eliminated if the RAM cache is deemed to be
            too small to hold duplicate data */
            if ( diskn )
                add_cache(transfer_address,cd_sector,diskn);

/* adjust the count of cd sectors found */
            n += diskn;
            /* we are done if we have already transferred
            everything we need */
            if ( n == count )
                return(count);
        }

/* return the number of cd sectors actually transferred
        from the beginning of the original request */
        return(n);
30  }
```

53
```
/*                      PART 4
        AVOIDING FRAGMENTATION (PART OF SERVICING DATA REQUEST)
              This part includes pseudo-code for In_disk_cache,
     add_disk_cache and several lower level utilities.
              In_disk_cache(transfer_address,cd_sector,count) is
     the function which checks the DISK cache for a cache hit.  It
     returns the number of sectors that were found at the beginning
     of the request.  The cd_sector is the actual cd disc sector
     without the CURRENT_DISC combined with it.
              Add_disk_cache(transfer_address,cd_sector,count) is
     called to add data to the disk based caching upon completion of
     the actual I/O by the CD-ROM drive.  The cd_sector is the actual
     cd disc sector without CURRENT_DISC.  In rare cases
     add_disk_cache() might not be able to cache and will not
     do anything.  It returns 0 for failure and count if successful.
              In_disk_cache and add_disk_cache are the main
     external entry points for the disk based caching capability. */

     add_disk_cache(transfer_address,cd_sector,count)
     {
              ulong i;                /* loop counter */
              ushort iterations = 0;  /* a counter to limit search for
                                         appropriate space*/
              ulong realsector;       /* a place to compute the
                                         physical disk sector */
              ushort wrapped = 0;     /* a flag to remember going back
                                         to beginning */

              /* if we don't have an identifiable disc, abort */
              if ( CURRENT_DISC == 0xff000000L )
                     return(0);

/* compute the cd_sector key to be used with the data
              structure */
              cd_sector |= CURRENT_DISC;
```

54

```
/* search until a physically contiguous area in the cache
file is found */
while ( 1 )
{
        /* make sure we fit within the logical limits of the
        cache file */
        if ( DIR.nextsector/4+count > DIR.cd_sectors )
        {
        /* check if we have already searched the whole cache
        file */
                if ( wrapped )
                {
        /* can't allocate large enough contiguous space */
                        return(0);
                }

/* wrap to the beginning */
                DIR.nextsector = 0;

/* remember that we have wrapped to the
                beginning */
                wrapped = 1;
        }

/* now check for physical contiguity */
        realsector = DIR.nextsector;
        if ( (i=real_sector(&realsector)) >= count*4 )
                break;   /* we found it! */ if ( ++iterations >= 10 )
                return(0);    /* too much local fragmentation,
                                 can't allocate */

/* skip to the beginning of the next physical
        fragment */
        DIR.nextsector += i;
}
```

```
                                55
        if ( (i=find_cd_sector(cd_sector)) != ILLEGAL_SECTOR &&
                contiguous_length(i) >= count )
        {
                /* a contiguous block already exists for the entire
                request */
                return(0);      /* nothing to do */
        }

/* the code above provides enough physically contiguous
        disk sectors to store count cd rom sectors */
        set_cd_index(DIR.nextsector/4);

/* add each cd_sector to the data structure */
        for (i=0; i<count; i++,cd_sector++)
                add_cd_sector(cd_sector);

diskwrite(transfer_address,realsector,count*4);  /* write
                                                            to cache */
        DIR.nextsector += count * 4;
        /* do any other processing needed */
        .... /* do directory sector update [see DIR.DOC] */
        return(count);
    }
   in_disk_cache(transfer_address,cd_sector,count)
    {
        ulong index;            /* loop counter */
        ulong len;              /* maximum number of physically
                                   contiguous sectors*/
        ulong realsector;       /* a place to compute the
                                   physical disk sector */

        /* if we don't have an identifiable disc, so abort */
        if ( CURRENT_DISC == 0xff000000L )
                return(0);
```

56

```
        /* compute the cd_sector key to be used with the data
        structure */
        cd_sector |= CURRENT_DISC;

       /* make sure at least 1 sector is in the disk cache */
        if ( (index=find_cd_sector(cd_sector)) == ILLEGAL_SECTOR )
            return(0);

/* compute how many sectors are physically contiguous */
        if ( (len=contiguous_length(index)) < count )
            count = len;

realsector = index * 4;         /* compute logical sector */
        real_sector(&realsector);       /* convert logical to
                                           physical */
        diskread(transfer_address,realsector,count*4); /* read
                                                  from cache */
        return(count);
    }
    /*
    *******************************
    LOW LEVEL UTILITY FUNCTIONS
    *******************************
    real_sector(ulong *disksector) converts the logical disksector
    to the actual physical sector number usable by the low level
    diskwrite/diskread functions. It returns the number of disk
    sectors left in this physical fragment.
    diskwrite() and diskread() write/read physical sectors using
    standard PC INT 13h functions. The cylinder/head/sector
    mapping details are hidden from the caller. The sector number
    is a physical sector number relative to the beginning of the
    disk drive. The number of 512 byte sectors is specified.

add_cd_sector(cdsector) is responsible for updating the disk
    caching data structures so that find_cd_sector(cdsector) will
```

57 find cdsector. The order that add_cd_sector() is called
determines the location of the cdsector which is passed in.
The first one corresponds to the first 2048 bytes of the cached
data area of the file. The second call represents the second
2K bytes, etc. This sequential nature can be overridden with a
call to set_cd_index() below. This function is also
responsible for maintaining the validity of contiguous_length()
below.

set_cd_index(cdindex) works in conjunction with add_cd_sector()
and makes the next call to correspond to the cdsector which is
passed in.

find_cd_sector(cdsector) is responsible for looking up the
cdsector which is passed in and returning the cd index which is
compatible with set_cd_index(). ILLEGAL_SECTOR is returned if
the cdsector can't be found. The returned cd index * 4 is the
logical disk sector number which can be used with real_sector
to convert it to a physical sector. This function needs to
make sure the the cdindex of the largest contiguous block of
cdsectors is returned.

contiguous_length(cdindex) returns the number of consecutive cd
sectors cached starting with cdindex. cdindex is compatible
with set_cd_index()'s parameter and find_cd_sector()'s return
value.

The group of functions: add_cd_sector(), set_cd_index(),
find_cd_sector(), contiguous_length() can be implemented via a
variety of standard ways. The simplest would be to have the
following data structure with the following macros and
functions implementing a linear search. */

```
struct cdsector
{
        ulong contiguous;    /* value used by
                                (set_)contiguous_length() */
```

58

```
        ulong cdsector;      /* value used by add/find_cd_sector
                                and set_cd_index */
   } CDSECTORS[MAXCDSECTORS];

   ulong cd_index = 0;       /* value used to access CDSECTORS */

/* The following three functions are so simple, they can be
   macros */
   #define set_cd_index(index) (cd_index = index)
   #define contiguous_length(index) CDSECTORS[index].contiguous add_cd_sector(ulong cdsector)
   {
        ulong i,disksector,realsector;
   /* first we set the current entry with the parameter value */
        CDSECTORS[cd_index].cdsector = cdsector;

/* the contiguous length starting at this index is 1 */
        CDSECTORS[cd_index].contiguous = 1;

realsector = cd_index * 4;    /* this is the logical disk
                                         sector */
        real_sector(&realsector); /* convert logical to physical*/
        /* we need to scan backward to update the contiguous
        length fields */
        if ( cd_index > 0 )      /* no need if this is the first
                                    entry */
        {
              /* we will scan backward making sure we are
              contiguous */
              for (i=cd_index-1; i>=0; i--) /* stop when we reach
                                               the beginning */
              {
                    /* decrement the value to be the previous
                    adjacent cd rom sector cdsector - decrement the
                    physical disk sector to previous cd rom area */
```

59

```
         realsector -= 4;    /* 4 x 512 bytes for one cd
                                rom sector */

/* with the cache file potentially fragmented,
         it is possible to have a discontinuity on the
         physical disk even though at the logical disk
         level it is contiguous */
         disksector = i * 4; /* this is the logical disk
                                sector */
         real_sector(&disksector);   /* convert logical
                                        to physical */

/* if both the cdsector and diskphysical match
         the previous adjacent entry, then we need to
         update the contiguous length */
         if ( CDSECTORS[i].cdsector == scan_cd &&
disksector == realsector )
                  CDSECTORS[i].contiguous++;
              else /* we have detected a discontinuity */
                  break;    /* we can stop updating */
           }
       }

/* increment the index to be the subsequent adjacent entry */
       cd_index++;
    } find_cd_sector(ulong cdsector)
    {
       ulong i,maxindex,maxlength = 0;

/* we need to search to the end of the data structure,
       since there could be duplicate entries for cdsector. We
       want to return the index to the entry with the largest
       amount of contiguous sectors for (i=0; i<MAXCDSECTORS; i++)
       {
```

```
        /* We found a match! */
        if ( CDSECTORS[i].cdsector == cdsector )
        {
                /* check to see if this is the best one yet */
                if ( CDSECTORS[i].contiguous > maxlength )
                {
                        /* if it is, we need to save the value and
                        index for later */
                        maxlength = CDSECTORS[i].contiguous;
                        maxindex = i;
                }
        }
    }

    /* if maxlength is 0, we couldn't find any match */
    if ( maxlength == 0 )
            return(ILLEGAL_SECTOR);

/* if we get here we maxindex is the best match */
    return(maxindex);
}
```

What is claimed is:

1. An apparatus for storing data for a plurality of optical disk storage media alternatively loadable into a common optical disk drive, the apparatus comprising:

a non-volatile memory portion of a hard disk for storing disk data read from the plurality of optical disk storage media, a plurality of respective optical disk identification codes stored in non-volatile memory and corresponding to a plurality of optical disk storage media alternatively loadable into the common optical disk drive, each identification code unique to a corresponding optical disk storage media;

an index stored in non-volatile memory pointing among said plurality of identification codes to a currently accessible optical disk storage media;

a first data structure stored in non-volatile memory for mapping at least a portion of said disk data stored in the non-volatile memory to corresponding address locations on an associated optical disk storage media, said first data structure comprising a first tag associated with first disk data read from a first optical disk storage media and a second tag associated with second disk data read from a second optical disk storage media; and a digital processing means for processing a current data request addressing disk data of the currently accessible optical disk storage media, the digital processing means comprising:

(i) means for defining the index pointing among said plurality of identification codes which corresponds to the currently accessible optical disk storage media;

(ii) means for accessing the first data structure to identify whether first disk data for the current data request is stored in nonvolatile memory;

(iii) means for accessing first disk data from said non-volatile memory without first restoring said first disk data from a first optical disk storage media into the non-volatile memory following changes in the currently accessible optical disk storage media away from the first optical disk storage media and back to the first optical disk storage media, when said disk data is stored in said non-volatile memory; and (iv) means for estimating access time for the currently accessible optical disk storage media based upon locations of data specified by (i) the current data request and (ii) a preceding data request in which said currently accessible optical disk storage media was accessed.

2. The apparatus of claim 1, in which the digital processing means further comprises:

(v) means for accessing the first disk data from said non-volatile memory when estimated access time of the optical disk storage media is greater than a first percentage of hard disk access time beyond hard disk access time.

3. The apparatus of claim 1, in which the digital processing means further comprises:

(v) means for deciding whether I/O for the currently accessible optical disk storage media occurring within a prior first window of time exceeds a first throughput; and (vi) means for directing data for the current data request to be stored in said non-volatile memory upon satisfaction of either of the following conditions: (i) the estimated access time of the optical disk storage media is greater than a first percentage beyond hard disk access time; or (ii) said I/O occurring within the prior first window of time does not exceed the first throughput.

4. An apparatus for storing data for a plurality of optical disk storage media alternatively loadable into a common optical disk drive, the apparatus comprising:

a non-volatile memory portion of a hard disk for storing disk data read from the plurality of optical disk storage media, a plurality of respective optical disk identification codes stored in non-volatile memory and corresponding to a plurality of optical disk storage media alternatively loadable into the common optical disk drive, each identification code unique to a corresponding optical disk storage media;

an index stored in non-volatile memory pointing among said plurality of identification codes to a currently accessible optical disk storage media;

a first data structure stored in non-volatile memory for mapping at least a portion of said disk data stored in the non-volatile memory to corresponding address locations on an associated optical disk storage media, said first data structure comprising a first tag associated with first disk data read from a first optical disk storage media and a second tag associated with second disk data read from a second optical disk storage media; and a digital processing means for processing a current data request addressing disk data of the currently accessible optical disk storage media, the digital processing means comprising:

(i) means for defining the index pointing among said plurality of identification codes which corresponds to the currently accessible optical disk storage media;

(ii) means for accessing the first data structure to identify whether first disk data for the current data request is stored in nonvolatile memory;

(iii) means for accessing first disk data from said non-volatile memory without first restoring said first disk data from a first optical disk storage media into the non-volatile memory following changes in the currently accessible optical disk storage media away from the first optical disk storage media and back to the first optical disk storage media, when said disk data is stored in said non-volatile memory;

(iv) means for deciding whether the current data request is for data on the currently accessible optical disk storage media which is contiguous to data from a previous optical disk storage media data request; and (v) means for deciding whether I/O for the currently accessible optical disk storage media occurring within a prior first window of time exceeds a first throughput; and wherein data for the current data request is stored in the non-volatile memory upon satisfaction of either of the following conditions: (a) data for the current data request is not contiguous with data from said previous optical disk storage media data request; or (b) data for the current data request is contiguous with data from said previous optical disk storage media data request and said I/O occurring within said prior first window does not exceed the first throughput.

* * * * *